(12) United States Patent
Benda et al.

(10) Patent No.: US 12,158,885 B2
(45) Date of Patent: *Dec. 3, 2024

(54) ABSTRACTION LAYER FOR EFFICIENT TRANSLITERATION OF MACHINE INTERPRETABLE LANGUAGES

(71) Applicant: Bank of America Corporation, Charlotte, NC (US)

(72) Inventors: Carl M. Benda, Charlotte, NC (US); Maharaj Mukherjee, Poughkeepsie, NY (US); Utkarsh Raj, Charlotte, NC (US); Elvis Nyamwange, Little Elm, TX (US); Suman Roy Choudhury, Jersey City, NJ (US)

(73) Assignee: Bank of America Corporation, Charlotte, NC (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/557,418

(22) Filed: Dec. 21, 2021

(65) Prior Publication Data

US 2023/0130019 A1  Apr. 27, 2023

Related U.S. Application Data

(60) Provisional application No. 63/272,263, filed on Oct. 27, 2021.

(51) Int. Cl.
*G06F 16/24* (2019.01)
*G06F 16/21* (2019.01)
(Continued)

(52) U.S. Cl.
CPC ........ *G06F 16/2452* (2019.01); *G06F 16/214* (2019.01); *G06F 16/2425* (2019.01);
(Continued)

(58) Field of Classification Search
CPC .................................................. G06F 16/2452
See application file for complete search history.

(56) References Cited

U.S. PATENT DOCUMENTS

| 5,432,948 A | 7/1995 | Davis et al. |
| 5,640,587 A | 6/1997 | Davis et al. |

(Continued)

OTHER PUBLICATIONS

Mar. 13, 2023—(US) Office Action—U.S. Appl. No. 17/557,456.
(Continued)

*Primary Examiner* — Mohammad S Rostami
(74) *Attorney, Agent, or Firm* — Banner & Witcoff, Ltd.

(57) ABSTRACT

Aspects of the disclosure relate to transliteration of machine interpretable languages. A computing platform may receive a request to perform a data migration from a first database configured in a first format to a second database configured in a second format. The computing platform may receive, from the client application and at an abstraction layer, a query. Based on identifying that the query is formatted for execution at the second database, the computing platform may route the query to the second database for execution. Based on identifying that the query is not formatted for execution at the second database, the computing platform may: 1) translate the query from the first format to the second format by using pre-verified query keys to convert the query from the first format into the second format, and 2) route the translated query to the second database for execution.

20 Claims, 25 Drawing Sheets

(51) Int. Cl.
  *G06F 16/242* (2019.01)
  *G06F 16/2452* (2019.01)
  *G06F 16/2453* (2019.01)
  *G06F 16/248* (2019.01)
  *G06F 16/25* (2019.01)
  *G06F 40/205* (2020.01)

(52) U.S. Cl.
  CPC ...... *G06F 16/2433* (2019.01); *G06F 16/2448* (2019.01); *G06F 16/24534* (2019.01); *G06F 16/248* (2019.01); *G06F 16/258* (2019.01); *G06F 40/205* (2020.01)

(56) References Cited

U.S. PATENT DOCUMENTS

| | | | |
|---|---|---|---|
| 5,987,452 A | 11/1999 | Kung | |
| 6,134,540 A | 10/2000 | Carey et al. | |
| 6,425,123 B1 | 7/2002 | Rojas et al. | |
| 6,460,015 B1 | 10/2002 | Hetherington et al. | |
| 6,890,180 B2 | 5/2005 | Sterns et al. | |
| 7,099,876 B1 | 8/2006 | Hetherington et al. | |
| 7,369,986 B2 | 5/2008 | Janakiraman et al. | |
| 7,805,290 B2 | 9/2010 | Janakiraman et al. | |
| 7,835,903 B2 | 11/2010 | Datta | |
| 7,853,444 B2 | 12/2010 | Wang et al. | |
| 7,885,807 B2 | 2/2011 | Bagnato et al. | |
| 8,005,664 B2 | 8/2011 | Hanumanthappa | |
| 8,275,600 B2 | 9/2012 | Bilac et al. | |
| 8,275,601 B2 | 9/2012 | Wang et al. | |
| 8,326,600 B2 | 12/2012 | Elfeky et al. | |
| 8,438,008 B2 | 5/2013 | Awaida et al. | |
| 8,463,597 B2 | 6/2013 | Elizarov et al. | |
| 8,510,095 B2 | 8/2013 | Wang et al. | |
| 8,515,730 B2 | 8/2013 | Fux et al. | |
| 8,521,761 B2 | 8/2013 | Katragadda et al. | |
| 8,554,537 B2 | 10/2013 | Rai et al. | |
| 8,560,298 B2 | 10/2013 | Kumaran et al. | |
| 8,655,642 B2 | 2/2014 | Fux et al. | |
| 8,655,643 B2 | 2/2014 | Haddad et al. | |
| 8,682,643 B1 | 3/2014 | Hafez | |
| 8,725,491 B2 | 5/2014 | Elizarov et al. | |
| 8,731,901 B2 | 5/2014 | Srihari et al. | |
| 8,762,129 B2 | 6/2014 | Huang et al. | |
| 8,762,358 B2 | 6/2014 | Datta et al. | |
| 8,775,165 B1 | 7/2014 | Oikawa | |
| 8,972,238 B2 | 3/2015 | Wang et al. | |
| 9,009,021 B2 | 4/2015 | Ushakov et al. | |
| 9,176,936 B2 | 11/2015 | Jan et al. | |
| 9,189,557 B2 | 11/2015 | Singh et al. | |
| 9,323,744 B2 | 4/2016 | Hagiwara | |
| 9,330,138 B1 | 5/2016 | Shankar et al. | |
| 9,489,351 B2 | 11/2016 | Scriffignano et al. | |
| 9,535,963 B1 | 1/2017 | Shankar et al. | |
| 9,665,275 B2 | 5/2017 | Huang et al. | |
| 9,858,268 B2 | 1/2018 | Huang et al. | |
| 9,858,269 B2 | 1/2018 | Huang et al. | |
| 9,928,040 B2 | 3/2018 | Tarlow et al. | |
| 9,928,828 B2 | 3/2018 | Fume et al. | |
| 10,089,975 B2 | 10/2018 | Fume et al. | |
| 10,185,710 B2 | 1/2019 | Egi | |
| 10,373,606 B2 | 8/2019 | Ashikawa et al. | |
| 10,394,960 B2 | 8/2019 | Pino et al. | |
| 10,394,964 B2 | 8/2019 | Deshmukh et al. | |
| 10,402,489 B2 | 9/2019 | Pino et al. | |
| 10,496,948 B1 | 12/2019 | Liang | |
| 10,643,028 B1 | 5/2020 | Pino et al. | |
| 10,686,750 B2 | 6/2020 | Daryani et al. | |
| 10,706,056 B1 | 7/2020 | Lin et al. | |
| 10,810,380 B2 | 10/2020 | Pino et al. | |
| 11,032,676 B2 | 6/2021 | Mottes et al. | |
| 11,055,352 B1 | 7/2021 | Beitchman et al. | |
| 11,120,064 B2 | 9/2021 | Ash | |
| 11,269,824 B1* | 3/2022 | Waas | G06F 16/2448 |
| 11,294,870 B1 | 4/2022 | Waas et al. | |
| 11,360,937 B2 | 6/2022 | Shukes et al. | |
| 11,550,800 B1 | 1/2023 | Uthaman et al. | |
| 11,644,955 B1 | 5/2023 | Singamneni et al. | |
| 11,681,695 B2 | 6/2023 | Abrashkevich et al. | |
| 11,811,769 B2 | 11/2023 | Padmanabhan | |
| 2007/0073675 A1 | 3/2007 | Kaar et al. | |
| 2007/0100783 A1 | 5/2007 | Cialini et al. | |
| 2011/0295838 A1 | 12/2011 | Collins et al. | |
| 2013/0311447 A1* | 11/2013 | Liensberger | G06F 16/9535 707/E17.141 |
| 2013/0311642 A1 | 11/2013 | Morfonios et al. | |
| 2013/0318070 A1 | 11/2013 | Wu et al. | |
| 2014/0244680 A1 | 8/2014 | Chandran et al. | |
| 2014/0280259 A1* | 9/2014 | McGillin | G06F 16/2452 707/756 |
| 2016/0125029 A1 | 5/2016 | Damm | |
| 2016/0342650 A1 | 11/2016 | Damm | |
| 2016/0344810 A1* | 11/2016 | Das | G06F 3/0617 |
| 2016/0350375 A1* | 12/2016 | Das | G06F 16/2456 |
| 2016/0373402 A1 | 12/2016 | Becker | |
| 2017/0177888 A1 | 6/2017 | Arora et al. | |
| 2017/0228360 A1 | 8/2017 | Egi | |
| 2018/0275907 A1* | 9/2018 | Subramanian | G06F 3/0643 |
| 2018/0357444 A1 | 12/2018 | Kammath et al. | |
| 2019/0266163 A1* | 8/2019 | Johnson | G06F 16/248 |
| 2019/0288850 A1 | 9/2019 | Beecham et al. | |
| 2019/0318117 A1 | 10/2019 | Beecham et al. | |
| 2019/0362013 A1 | 11/2019 | Lewis et al. | |
| 2019/0370388 A1 | 12/2019 | Li et al. | |
| 2020/0012643 A1* | 1/2020 | Cuddihy | G06F 16/258 |
| 2020/0073863 A1* | 3/2020 | Jiang | G06F 16/2282 |
| 2020/0142890 A1 | 5/2020 | Zhang et al. | |
| 2020/0233721 A1* | 7/2020 | Mathur | G06F 3/067 |
| 2020/0311044 A1* | 10/2020 | Merker | G06F 16/289 |
| 2020/0334233 A1 | 10/2020 | Lee et al. | |
| 2020/0371778 A1 | 11/2020 | Ni et al. | |
| 2021/0042308 A1 | 2/2021 | Mustafi | |
| 2021/0089538 A1* | 3/2021 | Rooney | G06F 16/2282 |
| 2021/0117868 A1 | 4/2021 | Sriharsha | |
| 2021/0165808 A1 | 6/2021 | Sundström | |
| 2021/0279259 A1 | 9/2021 | Rastogi et al. | |
| 2021/0294776 A1 | 9/2021 | Shukes et al. | |
| 2021/0397682 A1* | 12/2021 | Padmanabhan | G06F 16/2379 |
| 2022/0035605 A1 | 2/2022 | Ibarra Von Borstel et al. | |
| 2022/0035611 A1 | 2/2022 | Cseri et al. | |
| 2022/0066752 A1 | 3/2022 | Zhang | |
| 2022/0269580 A1 | 8/2022 | Balasubramanian et al. | |
| 2022/0300543 A1 | 9/2022 | Sun et al. | |
| 2022/0405334 A1 | 12/2022 | Rozich et al. | |
| 2023/0031327 A1 | 2/2023 | Bourbie et al. | |
| 2023/0049730 A1 | 2/2023 | Abrashkevich et al. | |
| 2023/0127193 A1 | 4/2023 | Mukherjee et al. | |
| 2023/0128406 A1 | 4/2023 | Raj et al. | |
| 2023/0128497 A1 | 4/2023 | Vijayan et al. | |
| 2023/0129782 A1 | 4/2023 | Benda et al. | |
| 2023/0129994 A1 | 4/2023 | Mukherjee et al. | |
| 2023/0130019 A1 | 4/2023 | Benda et al. | |
| 2023/0130267 A1 | 4/2023 | Mukherjee et al. | |
| 2024/0070149 A1 | 2/2024 | Khalyknazarov et al. | |
| 2024/0070151 A1 | 2/2024 | Khalyknazarov et al. | |
| 2024/0119028 A1 | 4/2024 | Kunz | |

OTHER PUBLICATIONS

Jul. 3, 2023—(US) Notice of Allowance—U.S. Appl. No. 17/557,456.
Aug. 22, 2023—(US) Office Action—U.S. Appl. No. 17/557,300.
Sep. 13, 2023—(US) Office Action—U.S. Appl. No. 17/557,366.
Sep. 18, 2023—(US) Office Action—U.S. Appl. No. 17/557,683.
Oct. 18, 2023—(US) Office Action—U.S. Appl. No. 17/557,456.
Mar. 15, 2024—(US) Office Action—U.S. Appl. No. 17/557,366.
Feb. 1, 2024—(US) Notice of Allowance—U.S. Appl. No. 17/557,456.
Feb. 21, 2024—(US) Notice of Allowance—U.S. Appl. No. 17/557,683.
Apr. 3, 2024—(US) Office Action—U.S. Appl. No. 17/557,300.
Dec. 21, 2023—(US) Office Action—U.S. Appl. No. 17/557,300.

(56) References Cited

OTHER PUBLICATIONS

Apr. 26, 2024—(US) Notice of Allowance—U.S. Appl. No. 17/557,208.
May 7, 2024—(US) Notice of Allowance—U.S. Appl. No. 17/557,456.
Aug. 16, 2024—(US) Notice of Allowance—U.S. Appl. No. 17/557,208.

* cited by examiner

105
| TERADATA SQL | ANSI TEMPLATE |
|---|---|
| select * FROM students WHERE class_id = XYZ; | SELECT * FROM "xxxx" WHERE "xxxx" = "xxxx" |
| DELETE FROM orders WHERE order_id IN EMEA | |
| select *  FROM    students WHERE major = MAJOR; | |
| delete FROM STUDENTS where class_id = ABC | DELETE FROM "xxxx" WHERE "xxxx" = "xxxx" |
| SELECT * from teachers WHERE class_id = ABC; | |
FIG. 1A
110
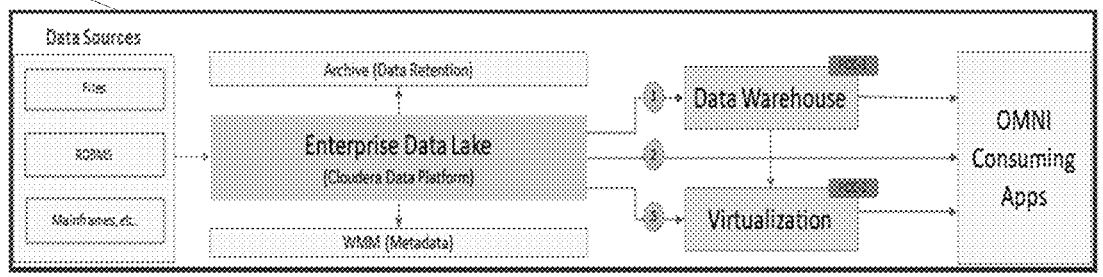
FIG. 1B
115
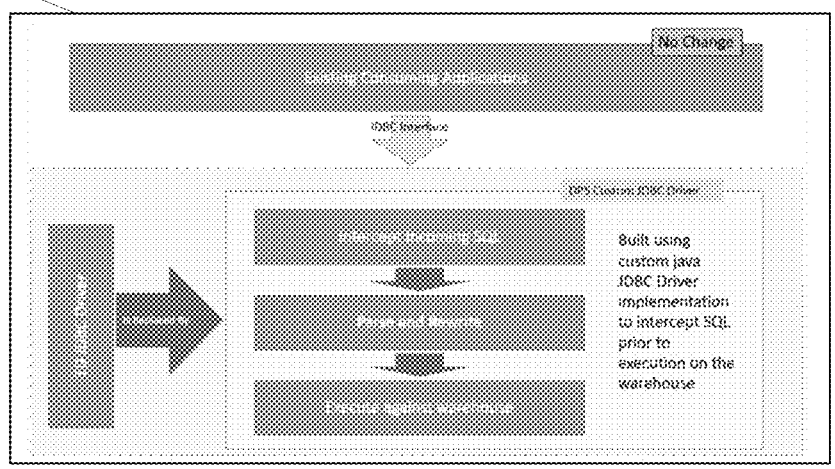
FIG. 1C

215

| KEY | FORMATTED STATEMENT |
|---|---|
| SELECT*FROM$0WHERE$1=$2 | SELECT * FROM $0 WHERE $1 = $2 |

| KEY | DICTIONARY OF PARAMETERS | RECONSTRUCTED SQL STATEMENT |
|---|---|---|
| SELECT*FROM$0WHERE$1=$2 | {'$0':'students', '$1':'class_id', '$2':'XYZ'} | SELECT * FROM students WHERE class_id = XYZ; |
| SELECT*FROM$0WHERE$1=$2 | {'$0':'teachers', '$1':'class_id', '$2':'ABC'} | SELECT * FROM teachers WHERE class_id = ABC; |
| SELECT*FROM$0WHERE$1=$2 | {'$0':'students', '$1':'major', '$2':'MAJOR'} | SELECT * FROM students WHERE major = MAJOR; |
| SELECT*FROM$0WHERE$1=$2 | {'$0':'TAs', '$1':'class_id', '$2':'DEF'} | SELECT * FROM TAs WHERE class_id = DEF; |

FIG. 2D

ABSTRACTION LAYER FOR EFFICIENT TRANSLITERATION OF MACHINE INTERPRETABLE LANGUAGES

CROSS-REFERENCE TO RELATED APPLICATIONS

This application claims the benefit of and priority to U.S. Provisional Patent Application Ser. No. 63/272,263, filed Oct. 27, 2021, and entitled "System and Method for Efficient Transliteration of Machine Interpretable Languages," which is incorporated by reference herein in its entirety.

BACKGROUND

Aspects of the disclosure relate to computer hardware and software for processing machine interpretable languages and translating queries. A variety of different machine interpretable languages may be used to generate queries for execution against data warehouses/sources. In some instances, however, such a machine interpretable language may be incompatible with, or otherwise might not be in a preferred format for, query processing. While these incompatible queries can sometimes be converted manually between different languages, the process for doing so is typically time consuming, expensive, inaccurate, and/or otherwise detrimental to user experience. For example, machine interpretable language processing (MILP) may have innate limitations that make it different from natural language processing (NLP). For instance, MILP (unlike NLP) might not tolerate any error. Accordingly, although a human may still understand the meaning of a translation despite significant errors, if a translated query contains any errors such as missing punctuation, capitalization, or incorrect wording, a machine may fail to execute the query. Furthermore, most MILP jobs need to be processed in real time, which might not allow time for conversational improvements (as is offered in NLP). Accordingly, it remains difficult to perform translation of machine interpretable language queries in an effective, efficient, timely, and accurate manner.

SUMMARY

Aspects of the disclosure provide effective, efficient, scalable, and convenient technical solutions that address and overcome the technical problems associated with processing machine interpretable languages and translating queries. In accordance with one or more embodiments of the disclosure, a computing platform comprising at least one processor, a communication interface, and memory storing computer-readable instructions may configure a client application to use a custom driver of the computing platform when communicating with an enterprise database. The computing platform may receive, from the client application and at the custom driver, a database query, where the database query is formatted in a first database format corresponding to a first database. The computing platform may translate, at the custom driver and using a query translation library, the database query from the first database format into a second database format corresponding to a second database, which may include causing the custom driver to execute a transliteration process using pre-verified query keys stored in the query translation library to convert the database query from the first database format into the second database format. The computing platform may execute, by the custom driver, the translated database query on the second database to obtain a query result. The computing platform may send, to the client application and by the custom driver, the query result.

In one or more instances, communicating with the enterprise database may include establishing a connection with the enterprise database, sending database queries to the enterprise database, and returning query results to the client application. In one or more instances, executing the transliteration process may include: 1) parsing the database query to create a query key; 2) storing query parameters; 3) executing a lookup function on a query library to identify a translated database query; and 4) updating the translated database query to include the query parameters to create an output query.

In one or more instances, parsing the database query to create the query key may include: 1) extracting non-essential portions of the database query; and 2) replacing the non-essential portions of the database query with pointers. In one or more instances, the translated database query may include the pointers.

In one or more instances, updating the translated database query to include the query parameters may include replacing the pointers with the query parameters. In one or more instances, based on identifying, during execution of the lookup function, that the query library includes portions of the query key rather than the query key, the computing platform may recursively identify the translated database query by nesting portions of the query key.

In one or more instances, recursively identifying the translated database query may include: 1) identifying a first stored query key corresponding to a first portion of the query key; 2) identifying a second stored query key corresponding to a second portion of the query key; and 3) combining the first stored query key with the second stored query key to create a combination query key that matches the query key.

In one or more instances, the computing platform may update, after obtaining the query result, the query library to include the combination query key. In one or more instances, the computing platform may identify whether the database query is formatted for execution at the second database, where translating the database query is responsive to identifying that the database query is not formatted for execution at the second database.

In accordance with one or more additional or alternative embodiments of the disclosure, a computing platform comprising at least one processor, a communication interface, and memory storing computer-readable instructions may receive a query, formatted in a first format for execution on a first database. The computing platform may translate the query to a second format for execution on a second database, by: 1) parsing the query to create a query key by: a) extracting non-essential portions of the query from the query, and b) replacing the non-essential portions of the query with pointers; 2) storing the non-essential portions of the query as query parameters, wherein the query parameters are stored along with their corresponding pointers; 3) executing a lookup function on a query library to identify a translated query corresponding to the query key, wherein the translated query includes the corresponding pointers; and 4) updating the translated query to include the query parameters based on the corresponding pointers to create an output query. The computing platform may execute the output query on the second database.

In one or more instances, the query may be received from a client application, and the computing platform may configure the client application to send the query to a custom driver configured to perform the query translation. In one or more instances, identifying the translated query may include: 1) comparing the query key to a plurality of pre-verified query keys to identify a match between the query key and at least one pre-verified query key; and 2) selecting the at least one pre-verified query key.

In one or more instances, updating the translated query to include the query parameters may include inputting the query parameters into the at least one pre-verified query key by replacing the corresponding pointers with the query parameters. In one or more instances, executing the lookup function on the query library to identify the translated query corresponding to the query key may include: 1) identifying that the query library includes portions of the query key rather than the query key; and 2) based on identifying that the query library includes portions of the query key rather than the query key, recursively identifying the translated query by nesting portions of the query key.

In one or more instances, recursively identifying the translated query may include: 1) identifying a first stored query key corresponding to a first portion of the query key; 2) identifying a second stored query key corresponding to a second portion of the query key; and 3) combining the first stored query key with the second stored query key to create a combination query key that matches the query key, where the translated query is the combination query key. In one or more instances, execution of the output query on the second database may produce a query result, and the query result may be returned to a client application that sent the query.

In one or more instances, the computing platform may update, after producing the query result, the query library to include the combination query key. In one or more instances, the computing platform may identify whether the query is formatted for execution at the second database, where translating the query is responsive to identifying that the query is not formatted for execution at the second database.

In one or more instances, the computing platform may receive a second query. The computing platform may identify whether the second query is formatted for execution at the second database. Based on identifying that the second query is already formatted for execution at the second database, the computing platform may execute the second query on the second database.

In accordance with one or more additional or alternative embodiments of the disclosure, a computing platform comprising at least one processor, a communication interface, and memory storing computer-readable instructions may receive a query, formatted in a first format for execution on a first database. The computing platform may translate the query to a second format for execution on a second database, which may include: 1) extracting non-essential parameters from the query to create a query key; 2) storing the non-essential parameters; 3) executing a lookup function on a query library to identify a translated query corresponding to the query key; 4) based on identifying that the query library includes portions of the query key rather than the query key, recursively identifying the translated query by nesting the portions of the query key; and 5) inputting the non-essential parameters into the translated query to create an output query. The computing platform may execute the output query on the second database In one or more instances, recursively identifying the translated query may include: 1) identifying a first stored query key corresponding to a first portion of the query key; 2) identifying a second stored query key corresponding to a second portion of the query key; and 3) combining the first stored query key with the second stored query key to create a combination query key that matches the query key, where the translated query is the combination query key. In one or more instances, the combination query key may include the second stored query key nested within the first stored query key.

In one or more instances, extracting the non-essential parameters from the query to create the query key may include replacing the non-essential parameters with pointers, where the first stored query key and the second stored query key include corresponding pointers. In one or more instances, inputting the non-essential parameters into the translated query to create the output query may include replacing the corresponding pointers of the first stored query key and the second stored query key with the non-essential parameters.

In one or more instances, the computing platform may update, after executing the output query on the second database, the query library to include the combination query key. In one or more instances, the query may be received from a client application, and the computing platform may configure the client application to send the query to a custom driver configured to perform the query translation.

In one or more instances, executing the lookup function on the query library to identify the translated query corresponding to the query key may include comparing the query key to a plurality of pre-verified query keys. In one or more instances, based on identifying that the query library matches one of the plurality of pre-verified query keys, the computing platform may input the non-essential parameters into the matching pre-verified query key to create the output query. In one or more instances, the computing platform may identify whether the query is formatted for execution at the second database, where translating the query is responsive to identifying that the query is not formatted for execution at the second database.

In accordance with one or more additional or alternative embodiments of the disclosure, a computing platform comprising at least one processor, a communication interface, and memory storing computer-readable instructions may receive a request to perform a data migration from a first database configured in a first format to a second database configured in a second format. The computing platform may configure an abstraction layer connected to the first database and the second database, where the abstraction layer may be configured to intercept queries from a client application to the first database and the second database. The computing platform may receive, from the client application and at the abstraction layer, a query. The computing platform may identify whether the query is formatted for execution at the second database. Based on identifying that the query is formatted for execution at the second database, the computing platform may route the query to the second database for execution to produce a query response. Based on identifying that the query is not formatted for execution at the second database, the computing platform may: 1) translate the query from the first format to the second format, wherein translating the query comprises executing a transliteration process using pre-verified query keys stored in a query translation library to convert the query from the first format into the second format, and 2) route the translated query to the second database for execution to produce the query response. The computing platform may send the query response to the client application.

In one or more instances, executing the transliteration process may include: 1) parsing the query to create a query key, which may include: a) extracting non-essential portions of the query from the query, and b) replacing the non-essential portions of the query with pointers; 2) storing the non-essential portions of the query as query parameters, where the query parameters are stored along with their corresponding pointers; 3) executing a lookup function on the query translation library to identify at least one pre-verified query key that matches the query, where the at least one pre-verified query key includes the corresponding pointers; and 4) updating the at least one pre-verified query key to include the query parameters based on the corresponding pointers to create the translated query.

In one or more instances, identifying the translated query may include: 1) comparing the query key to a plurality of pre-verified query keys to identify a match between the query key and the at least one pre-verified query key; and 2) selecting the at least one pre-verified query key. In one or more instances, updating the at least one pre-verified query key to include the query parameters may include replacing the corresponding pointers with the query parameters.

In one or more instances, executing the lookup function on the query translation library to identify the translated query corresponding to the query key may include: 1) identifying that the query translation library includes portions of the query key rather than the query key; and 2) based on identifying that the query translation library includes portions of the query key rather than the query key, recursively identifying the translated query by nesting portions of the query key.

In one or more instances, recursively identifying the translated query may include: 1) identifying a first pre-verified query key corresponding to a first portion of the query key; 2) identifying a second pre-verified query key corresponding to a second portion of the query key; and 3) combining the first pre-verified query key with the second pre-verified query key to create a combination query key that matches the query key, where the combination query key is formatted using the second format. In one or more instances, the combination query key may include the second pre-verified query key nested within the first pre-verified query key.

In one or more instances, execution of the translated query on the second database may produce a query result, and the query result may be returned to the client application. In one or more instances, the computing platform may update, after producing the query result, the query translation library to include the combination query key. In one or more instances, the translation may be performed using a custom driver configured with the abstraction layer.

In accordance with one or more embodiments of the disclosure, a computing platform comprising at least one processor, a communication interface, and memory storing computer-readable instructions may receive a source query, which may be formatted in a first format for execution on a source database. The computing platform may execute the source query on the source database to produce a first data result. The computing platform may input the first data result into a reversal logic engine to produce a target query formatted in a second format corresponding to a target database. The computing platform may execute the target query on the target database to produce a second data result. The computing platform may compare the second data result to the first data result to identify whether or not the second data result matches the first data result. Based on identifying that the second data result matches the first data result, the computing platform may validate the target query. Based on identifying that the second data result does not match the first data result, the computing platform may adjust the reversal logic engine based on a discrepancy between the second data result and the first data result.

In one or more instances, validating the target query may include: 1) extracting non-essential parameters from the target query; 2) replacing the non-essential parameters from the target query with pointers to create a pre-verified query key; and 3) storing the pre-verified query key in a query translation library. In one or more instances, the computing platform may receive, after adjusting the reversal logic engine, a first query, which may match the source query. The computing platform may translate a first query from the first format to the second format using the query translation library to produce a translated query. The computing platform may execute the translated query on the target database.

In one or more instances, translating the first query from the first format to the second format may include: 1) removing non-essential parameters from the first query; 2) replacing the non-essential parameters of the first query with the pointers to generate a query key; 3) executing a lookup function on the query translation library to identify at least one pre-verified query key that matches the query key, wherein the at least one pre-verified query key comprises the pre-verified query key; 4) selecting the pre-verified query key; and 5) inputting the non-essential parameters of the first query into the pre-verified query key by replacing the pointers with the non-essential parameters to produce an output query, formatted in the second format.

In one or more instances, adjusting the reversal logic engine may include refining one or more machine learning algorithms of the reversal logic engine to compensate for the discrepancy. In one or more instances, adjusting the reversal logic engine may include storing, in a query translation library and along with a pre-verified query key corresponding to the target query, one or more translation rules, where the one or more translation rules indicate an adjustment to target queries, output using the pre-verified query key, which compensates for the discrepancy.

In one or more instances, the one or more translation rules may be generated based on a user input. In one or more instances, the one or more translation rules may be automatically generated by the computing platform. In one or more instances, the source query may be received in response to a request to migrate queries from the source database to the target database. In one or more instances, the source query may be received in response to a request to refine the reversal logic engine.

In accordance with one or more additional or alternative embodiments of the disclosure, a computing platform comprising at least one processor, a communication interface, and memory storing computer-readable instructions may train a machine learning model using one or more source syntax trees, one or more target dialect syntax trees, and relationships between the one or more source syntax trees and the one or more target dialect syntax trees, where training the machine learning model may include configuring the machine learning model to output source dialect keys and their corresponding target dialect queries. The computing platform may execute the corresponding target dialect queries to identify whether the corresponding target dialect queries result in valid execution or result in error. For a first target dialect query resulting in valid execution, the computing platform may store the first target dialect query and first source dialect keys corresponding to the first target dialect query in a query library lookup table. For a second target dialect query resulting in error, the computing platform may: 1) identify a cause of the error; 2) generate a transliteration rule to correct the error; and 3) store, in the query library lookup table, the second target dialect query, second source dialect keys corresponding to the second target dialect query, and the transliteration rule.

In one or more instances, the computing platform may refine the machine learning model based on the identified cause of error. In one or more instances, the computing platform may receive a request to perform a data migration from a first database configured in the source dialect to a second database configured in the target dialect, where training the machine learning model may include training, during the data migration, the data migration.

In one or more instances, generating the transliteration rule may include generating, based on user input, the transliteration rule. In one or more instances, generating the transliteration rule may include automatically generating, based on the identified error, the transliteration rule.

In one or more instances, the computing platform may include a source database, formatted in the source dialect, and a target database, formatted in the target dialect, and executing the corresponding target dialect queries may include executing the corresponding target dialect queries on the target database. In one or more instances, the computing platform may receive, from a client application, a first source query formatted in the source dialect. The computing platform may translate the first source query to the target dialect to produce a translated query. The computing platform may execute the translated query on the target database to produce a query result. The computing platform may send, to the client application, the query result.

In one or more instances, translating the first source query to the target dialect may include: 1) parsing the first source query to create a query key by a) extracting non-essential portions of the first source query from the first source query; and b) replacing the non-essential portions of the first source query with pointers; 2) storing the non-essential portions of the first source query as query parameters, where the query parameters are stored along with their corresponding pointers; 3) executing a lookup function on the query library lookup table to identify a pre-verified target query corresponding to the first source query, where the identified pre-verified target query may be the second target dialect query and includes the corresponding pointers; and 4) updating the identified pre-verified target query to include the query parameters.

In one or more instances, identifying the pre-verified target query may include: 1) identifying that the query key matches the second source dialect keys; and 2) identifying that the second source dialect keys correspond to the second target dialect query. In one or more instances, updating the identified pre-verified target query to include the query parameters may include adjusting the second target dialect query based on the transliteration rule to produce the translated query.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 1A-1F depict illustrative systems and methods for performing efficient transliteration of machine interpretable languages in accordance with one or more example embodiments;

FIGS. 2A-2D depict illustrative diagrams for performing efficient transliteration of machine interpretable languages in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, Teradata SQL queries typically belong to a finite number of unique templates. As illustrated below, a given Teradata SQL input may be mapped to a specific translation included in a set of the pre-populated templates in a lookup table and then quickly reconstructed using its list of parameters. Additionally, as described further below, a transpiler may be used to automate translation of these Teradata SQL queries.

Figure 1D:
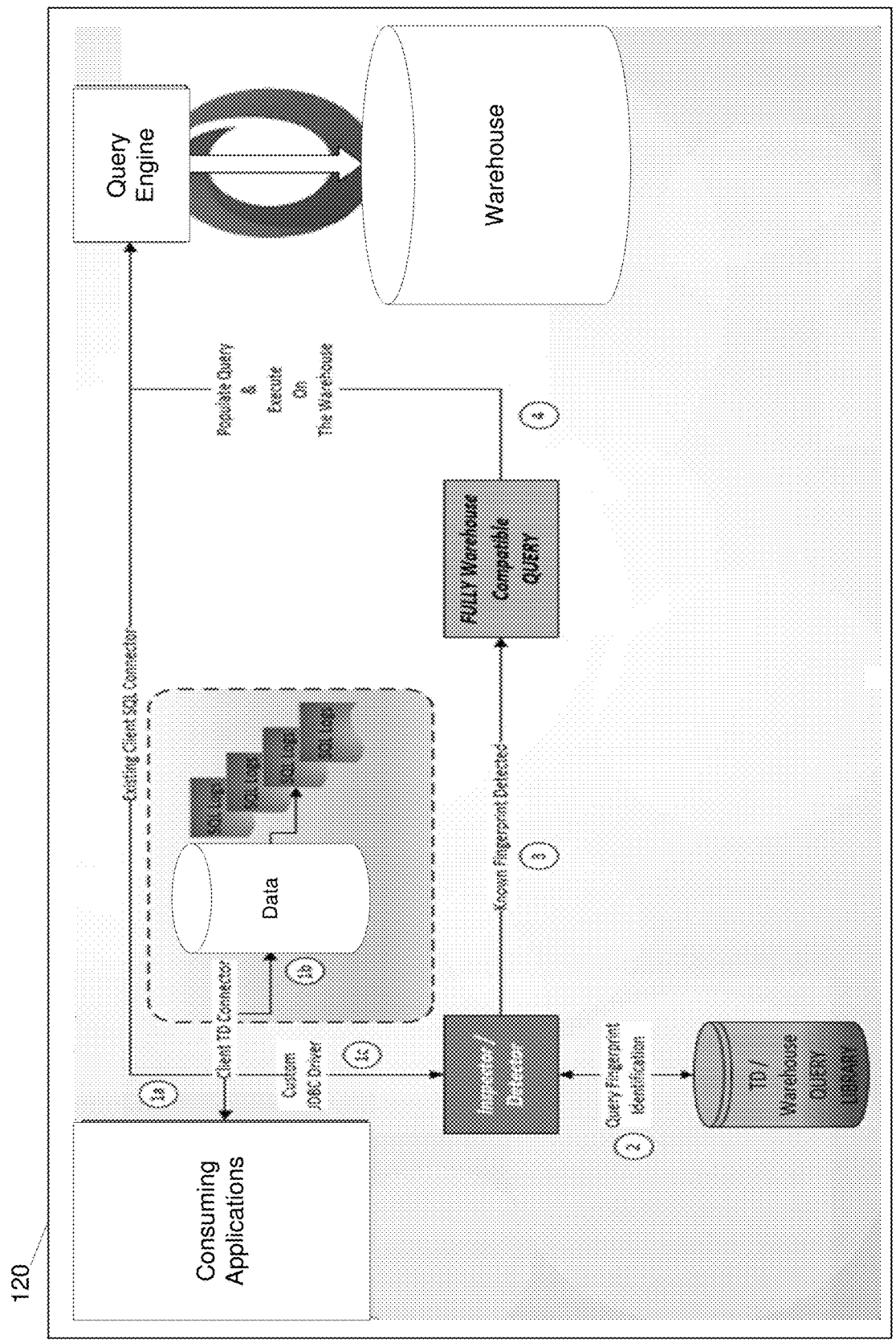

FIGS. 1A-1E depict illustrative systems and methods for performing efficient transliteration of machine interpretable languages in accordance with one or more example embodiments. One or more of the systems and methods described herein may provide a faster, cheaper, and/or more efficient conversion process for Teradata to ANSI SQL conversion. As illustrated in table 105, which is shown in FIG. 1A, many Teradata SQLs are similar to one another, and may be mapped to the same template of ANSI SQL. Accordingly, such Teradata SQLs may be quickly mapped to previously translated ANSI templates and reconstructed to produce or output a valid SQL.

Existing Teradata queries that have non-ANSI-92 specific syntax might not execute directly on a selected future warehouse solution. Accordingly, one or more of the systems and methods described herein describe seamless interception and rewriting of incompatible Teradata queries prior to execution on a future warehouse, and mirror the results from Teradata today, while minimizing consumer facing OMNI consumption impacts. As shown in diagram 110, which is illustrated in FIG. 1B, an enterprise data lake may serve data to applications requiring curated relational data structures, and may provide faster access via a data warehouse (see arrow #1). In some instances, the enterprise data lake may serve data to applications with flexible SLA requirements directly (see arrow #2). Additionally or alternatively, the enterprise data lake may serve data to interactive analytic applications requiring near real-time response times on large volumes of data (see arrow #3). As shown in diagram 115, which is illustrated in FIG. 1C, these consuming applications may interact with a DPS Custom JDBC Driver (e.g., via a JDBC interface), which may include custom Java JDBC driver implementation, which may intercept incoming SQL, parse and rewrite it, and execute the rewritten SQL against a data warehouse. Accordingly, there might not be any apparent impacts to consumers at these applications.

This is further illustrated in diagram 120, which is shown in FIG. 1D. For example, arrow 1*a* represents consumption queries today for non-Teradata queries, arrow 1*b* represents consumption queries today for Teradata queries, and arrow 1*c* represents consumption queries using a custom JDBC driver. In these instances, the inspector/detector system may match the query finger print in the TD/warehouse query library (as represented by arrow 2). Once identified, the optimized query may be selected and populated for execution on the warehouse (as represented by arrow 3), and the compatible query may then be populated and executed on the warehouse (as represented by arrow 4).

Figure 1E:
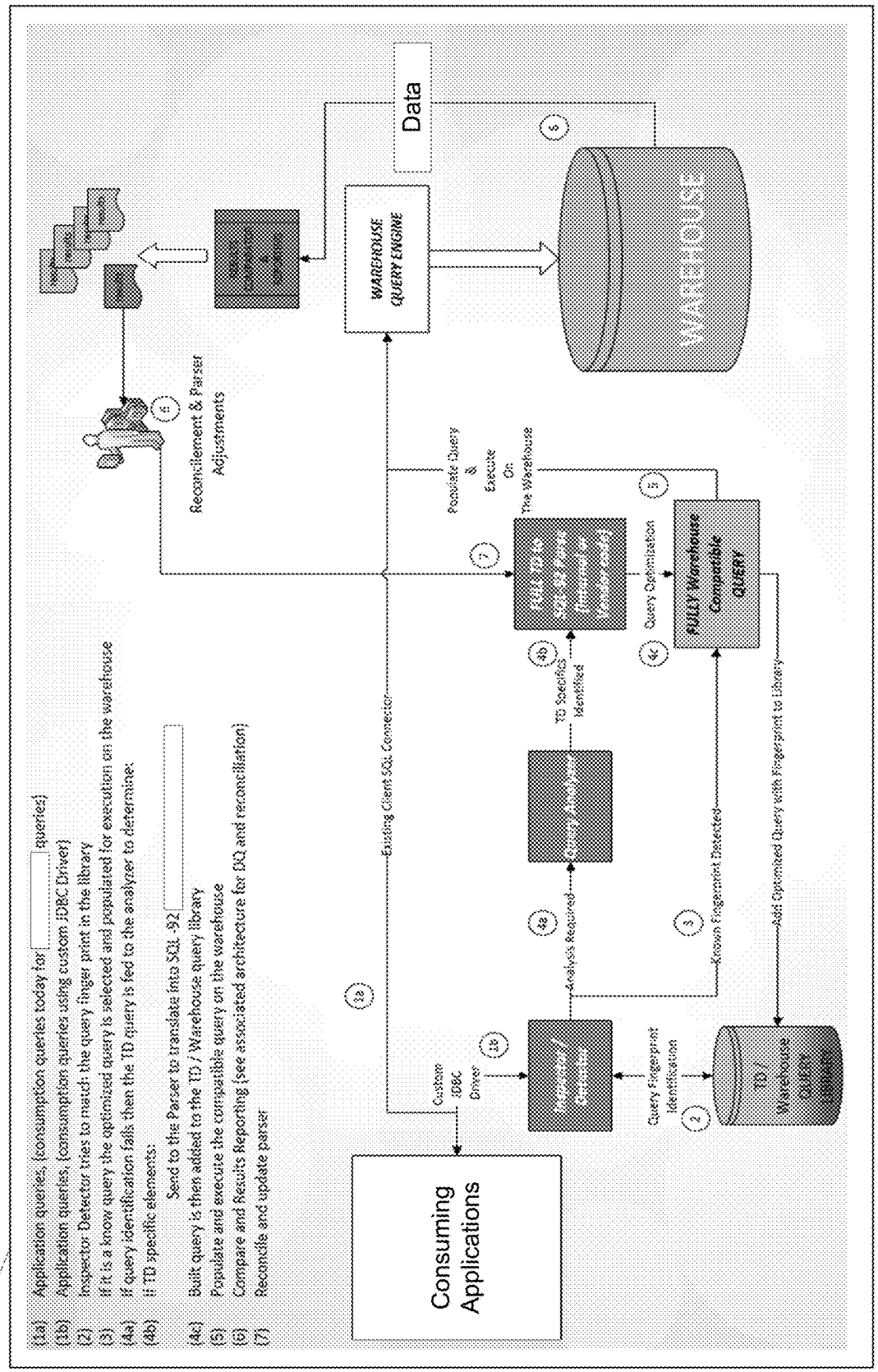

Diagram 125 (as shown in FIG. 1E) depicts further architecture details. For example, arrow 1*a* represents consumption queries today for non-Teradata queries and arrow 1*b* represents consumption queries using a custom JDBC driver. The inspector/detector system may try to match the query fingerprint in the TD/warehouse query library (as represented by arrow 2) using a lookup function. If the query is known, the inspector/detector system may select the optimized query and populate it for execution on the warehouse (as represented by arrow 3). If query identification fails, the inspector/detector system may feed the Teradata query into the query analyzer system (as represented by arrow 4*a*). If the query analyzer identifies specific Teradata elements, it may send the query to the parser, which may translate the query into SQL-92 (Sqlines, jOOQ, SALT, or the like), as represented by arrow 4*b*. The parser may then add the built query to the TD/warehouse query library as represented by arrow 4*c*, and may cause the compatible query to be populated and executed on the warehouse (as represented by arrow 5). The results of the query may then be compared, reconciled, and/or otherwise reported (as illustrated in arrow 6), and the parser system may be reconciled/updated accordingly (as represented by arrow 7).

Figure 1F:
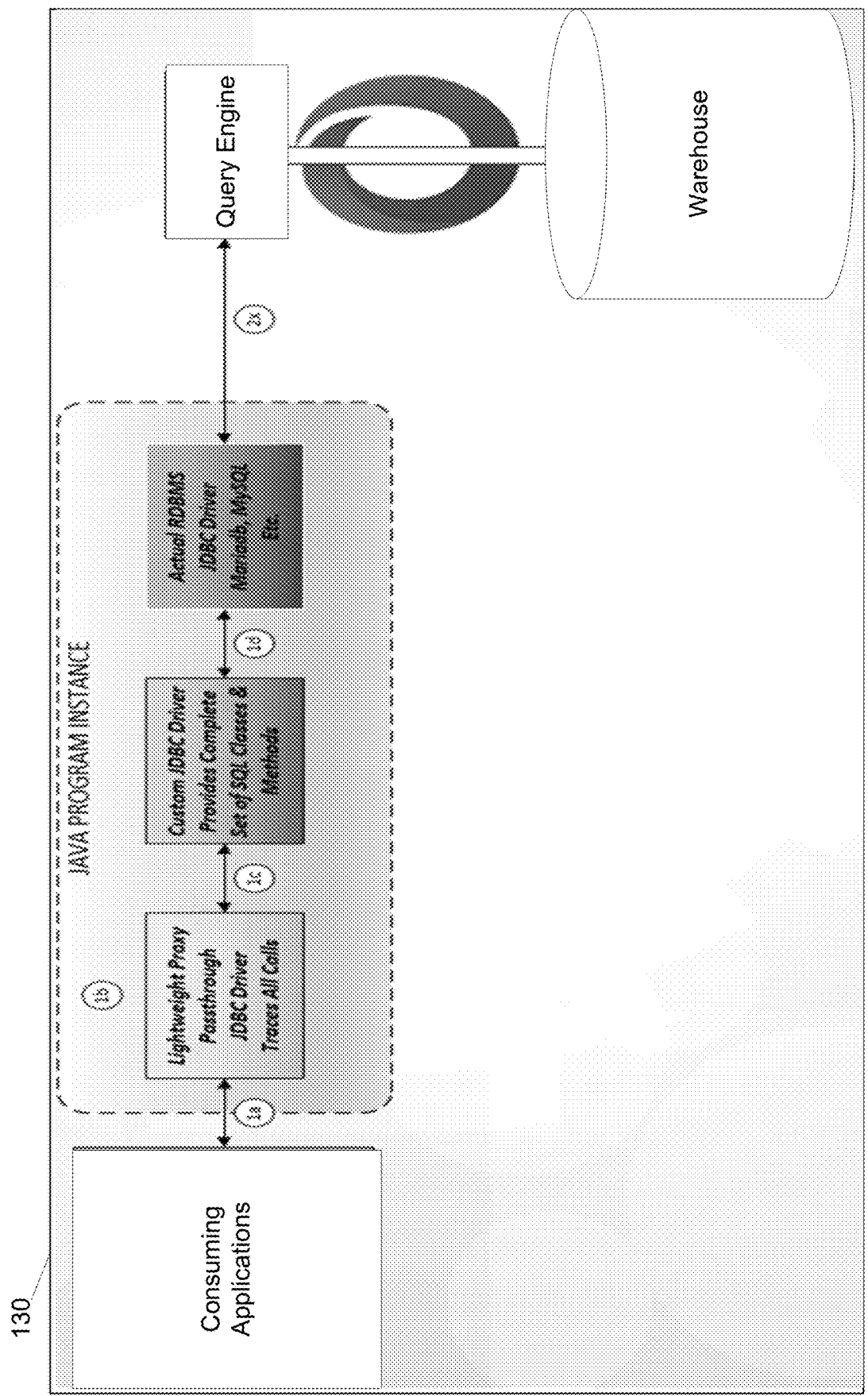

FIG. 1F depicts diagram 130, which illustrates a custom JDBC driver and tracer flow. As shown, the consuming applications may load java.sql.* classes, and may create a connection, statement, and/or result set objects (as shown by arrow 1*a*). A Java program instance may automatically register all available JDBC drivers (as shown in element 1*b*). A lightweight proxy pass through driver may then load the custom JDBC driver (as shown in arrow 1*c*), and the custom driver may load the destination RDBMS JDBC driver (as shown in arrow 1*d*). As represented by arrow 2*x*, once the connection is established, all interactions between the client and the RDBMS may appear transparent.

FIGS. 2A-2D depict illustrative diagrams for performing efficient transliteration of machine interpretable languages in accordance with one or more example embodiments. This concept applies to the general domain of machine interpretable language processing (MILP) and translating one machine interpretable language to another or a type of machine interpretable language from one dialect type such as Teradata SQL to another dialect type such as Hive SQL, ANSI SQL, and/or other dialect type.

MILP has certain problems that may make it different from natural language processing (NLP) as explained in further below. For example, unlike NLP, MILP might not tolerate any error. A human may still get the meaning despite significant errors present in the translation, whereas a machine may fail to execute a translation if there are any missing punctuations, an incorrect keyword is used, if a word is not properly capitalized, and/or if other errors are made. In addition, compared to NLP, MILP needs to be performed very fast. Most MILP jobs may need real time processing, and they might not allow time or conversational improvements as may be offered in the case of NLP.

Accordingly, one or more aspects of the disclosure provide a solution for this translation problem, which may be referred to as transliteration. In transliteration, rather than creating a translation from scratch, a pre-formatted template may be used to create a valid machine understandable code. The transliteration problem may deal with two steps. First, given a code written in a particular machine language to be translated, the transliteration method may identify and pull up correctly a particular pre-formatted template that may be used to create a complete machine understandable code. Then, once the template is identified, it may be enhanced/customized based on the input to create a complete machine understandable code.

In some instances, automated translation methods for translating an input set of code to an output set of code may apply a mechanical process of lexical and syntax analysis, and may perform it on a one-to-one bases. Such methods, however, may be extremely slow. For example, particularly for large codes, going over thousands of lines may require building one or more parse trees and traversing the parse trees several times. This may prevent the translation from occurring in real time. Further, such methods might not be able to keep up with newer versions of the code with newer syntax and/or other variations.

Accordingly, one or more aspects of the solution described herein includes template based pattern matching that may be used almost instantaneously (e.g., working proportional to the length of code, whereas previous methods may work merely in polynomial time of the length of the input code). Additionally, this solution may be agnostic of any linguistic variations.

Figures 2A, 2B:
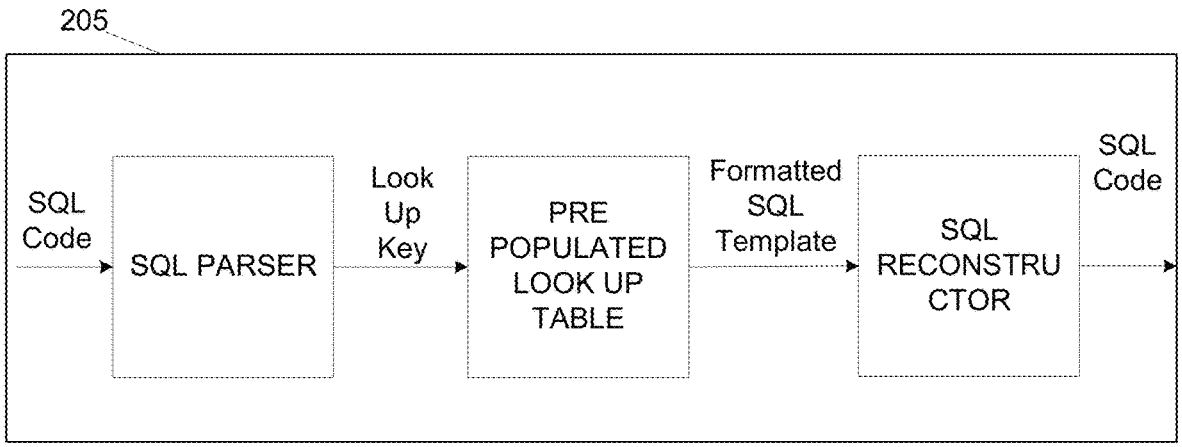

As described above, machine languages executed within an organization for some particular problem domain may include a lot of similarities in pattern, which may be represented by unique patterns or templates. A template may be a description of essential characteristics of a set of MIPL codes, so that they may all be grouped together. A machine learning (ML) based hybrid (supervised and unsupervised) clustering method may be used to identify the essential characteristics to create these templates. These essential characteristics may be created using ML based methods by systematically identifying the non-essential characteristics and filtering them out of the code, so that only the essential characteristics remain. For example, in a problem domain of translating Teradata SQL to Hive or ANSI SQL, the following may be non-essential: 1) the number of "\s" (space), "\t" (tab), "\n" (newline) depending on the context and the nature of the language; 2) the upper or lower-case syntax of the key words; 3) the punctuations depending on the context; 4) the parameters used to signify table or variable names—except for their locations; 5) the constants used; and/or 6) any complex or simple combinations of the above or combinations of the combinations. A look up key may be created based only on the remaining essential characteristics (as illustrated in table 210 of FIG. 2B). This look up key may be exactly the same for all similar codes to be transliterated, so that they may all map into the same pre-formatted template to be pulled up from a look up table. For example, Teradata SQL queries may essentially map into a smaller number of pre-formatted templates, as illustrated in table 105. This process is illustrated, for example, in diagram 205, which is shown in FIG. 2A.

For example, as shown in table 215 of FIG. 2C, keys may be associated with formatted statements (that may be used to reconstruct a query output). In some instances, parameters may be extracted from input queries (as shown in table 220 of FIG. 2D), and then used to reconstruct an output statement based on the keys. For example, such parameters and an identified key may be passed to a reconstructer system, which may generate an output query. By operating in this way, such translation may offer a technical advantage of being less computationally expensive than creating new queries on the fly every time. Furthermore, because the format, keys, and/or parameters have been tested in advance, the accuracy of the resulting queries may be ensured (which might not otherwise be the case).

Figures 3A, 3B, 3C:
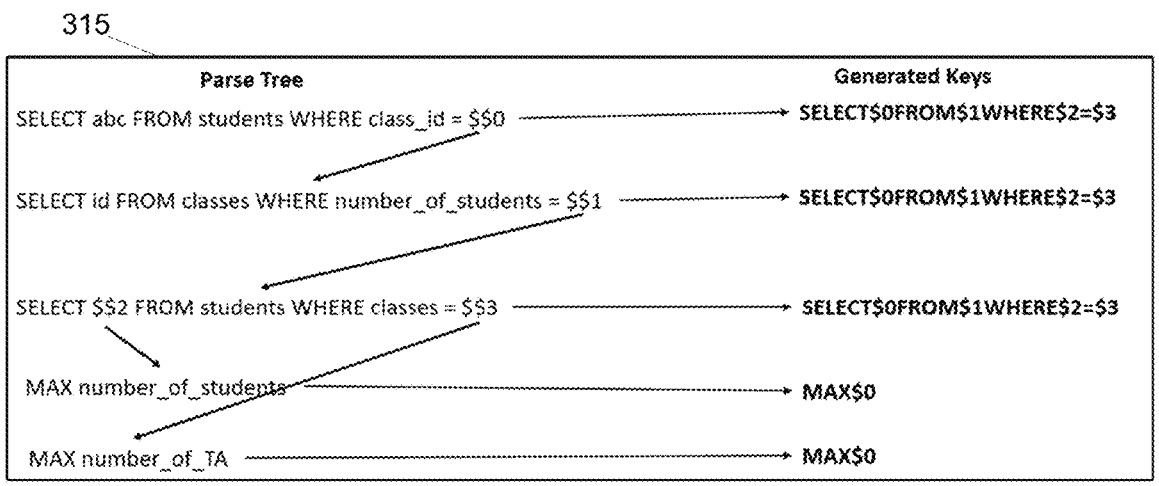
FIGS. 3A-3C depict diagrams that illustrate efficient recursive transliteration of machine languages in accordance with one or more example embodiments.

FIGS. 3A-3C depict diagrams that illustrate efficient recursive transliteration of machine languages in accordance with one or more example embodiments. These concepts build from those described above with regard to efficient transliteration as illustrated in FIGS. 1A-1F and 2A-2D. For example, those concepts may presume that a complete formatted template may be available that represents an entire input code, and that may be used to create the output. In some instances, however, it may be possible to provide templates for only part of the code.

For example, a parse tree may be created from a root by starting at the top level of input code. Using similar methods as those described above, and starting from the root of the parse tree, a key may be created. If a corresponding entry is found, a pointer may be created to that entry, and an associated dictionary of the parameters may be created (similar to as described above). If no entry is found, the process may be recursively repeated at each child level. If no entry is found even after expanding the whole process, a transpilation service may be created, which may create a key and format for the corresponding subtree. Then, as and when a key corresponding to the subtree is found, the transpilation created format may be used.

As a particular example, the following input SQL code may be received: "SELECT abc FROM students WHERE class_id=(SELECT id FROM classes WHERE number_of_students=(SELECT MAX number_of_students FROM classes WHERE MAX number_of_TA==2))". In this example, the available formats and keys may be limited to those illustrated in table 305 of FIG. 3A. Accordingly, it may be evident that the available formats and keys might not include a suitable key for the above input code. However, by using the available formats and templates recursively to create keys and parameters, the used keys and extracted parameters shown in diagram 310 of FIG. 3B may be identified. Using this information, a parse tree may be expanded as illustrated in diagram 315 of FIG. 3C, which may allow the query to be reconstructed.

In essence, the concept described/illustrated in FIGS. 3A-3C is a pattern building and matching methodology that includes: 1) recursively going down a parse tree from the root level and seeking an available template from a look up table by using a key; 2) if a template is found, creating a pointer to the key for the template and generating the corresponding dictionary of parameters; and 3) if a template is not found, transpiling the corresponding code segments for that particular parse sub tree and creating a corresponding template and key so that similar patterns can be used later for quick transliteration.

Figure 4A:
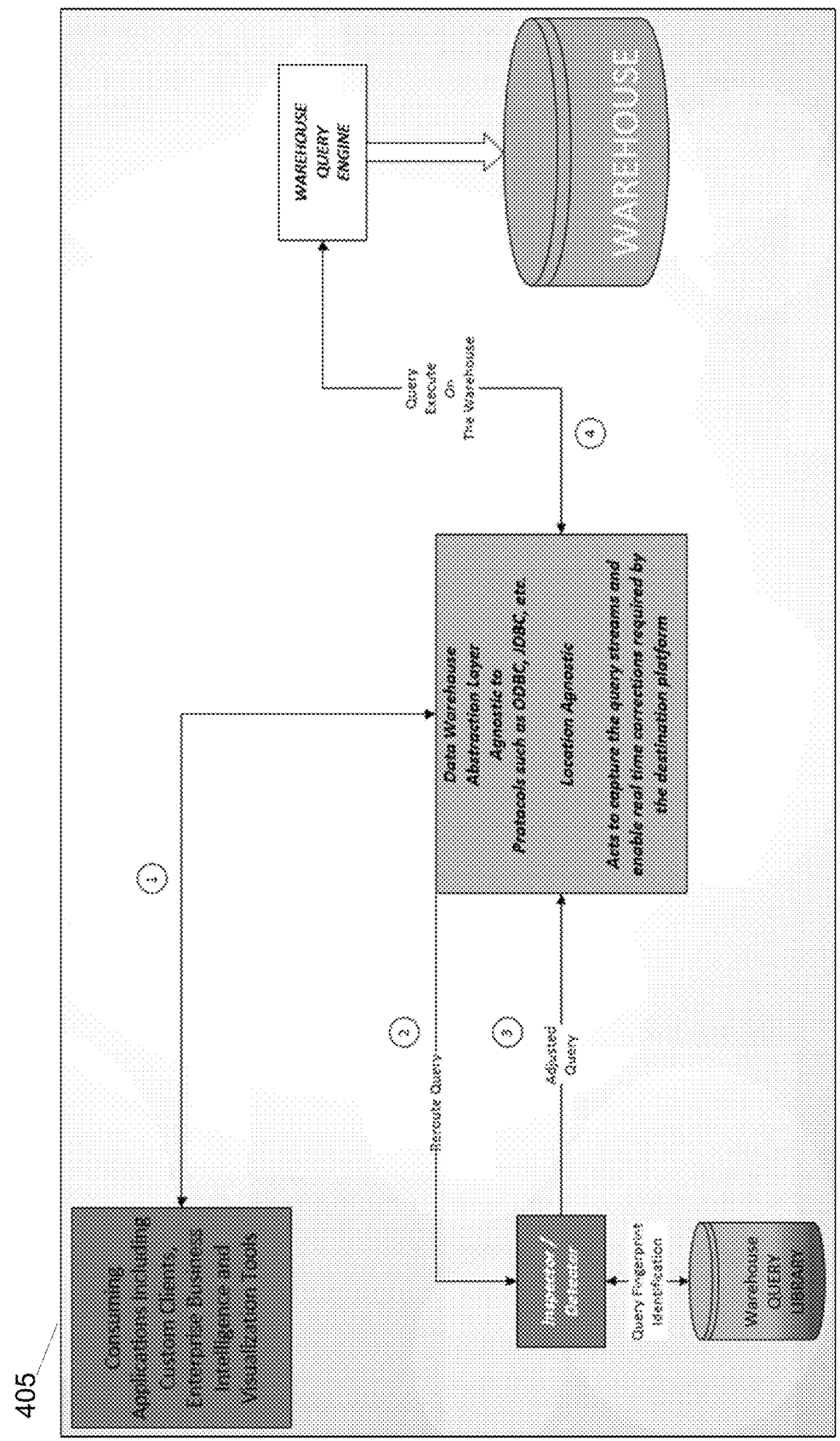
FIGS. 4A-4B depict a system for multi-client interconnection abstraction for data platform independence in accordance with one or more example embodiments.
Figure 4B:
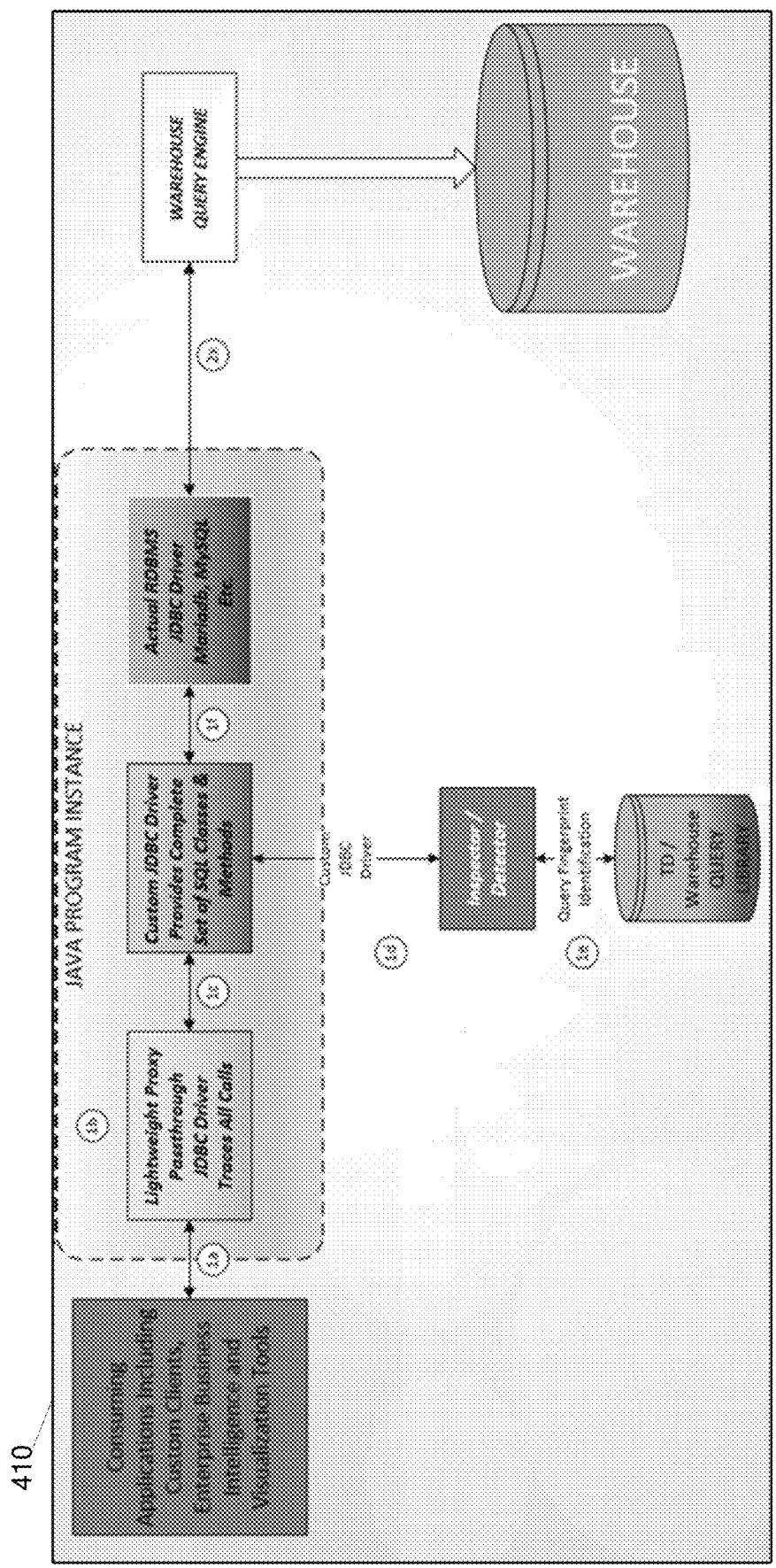

FIGS. 4A-4B depict a system for multi-client interconnection abstraction for data platform independence in accordance with one or more example embodiments. This concept applies to the general domain of client application and data platform independence and what is needed to seamlessly allow a client application to migrate from a former data platform to newer data platform technologies as they become available. For example, a user may wish to take advantage of newer data platforms such as MemSQL and migrate off Teradata.

Seamless adoption of newer data platforms, however, might not be possible in practice. For example, adoption of new data platforms may involve understanding how the connectivity, the language of the new platform, and the results are different than in the current environment. This adoption, however, may be inefficient and expensive. Moreover, even the evaluation of potential replacement data platforms may include a tradeoff between the potential effectiveness of newer technologies and the cost of evaluating these technologies against the considerable time and expense of requisite changes necessitated for those evaluations. If a method can be constructed to insulate and abstract the client changes needed for these evaluations and adoptions, the speed of change and the efficiencies of these evaluations may be greatly enhanced so as to enable the focus to be results oriented rather than integration complexity focused.

One or more of the systems and methods described herein may enable the efficient testing and adoption of new data platforms by obviating the need for client applications to be concerned with the extensive integration changes that might otherwise be necessary. By creating an abstraction layer, the client may easily evaluate multiple data platforms without being concerned with the plumbing and/or logic changes. As shown in diagram 405, which is illustrated in FIG. 4A, a client may be currently connected to a data platform provider or a data warehouse. The client may wish to explore modern alternatives, but may have impediments to doing so. By providing an abstraction layer such that the consuming application need not be concerned with either the requisite protocol nor SQL dialect differences, the client may concentrate on efficiently onboarding to a new data platform.

This is further depicted in diagram 410, which is illustrated in FIG. 4B. For example, the client application may load java.sql.* classes, and may create a connection, statement, and/or result set objects (as shown in arrow 1*a*). The Java program may automatically register all DJBC drivers available, as shown in element 1*b*. In some instances, the lightweight proxy pass through driver may load the custom JDBC driver as shown in arrow 1*c*, and the customer JDBC driver may integrate with the SQL analysis engine (which is represented by arrow 1*d* and is described further above). Also, as described above, the inspector/detector system may convert existing queries to be compatible with a new data platform (as represented by arrow 1*e*). The custom JDBC driver may then load the destination RDBMS JDBC driver (as represented by arrow 1*f*). Then, once the connection is established, all interactions between the client and the RDB may appear transparent to the client (as represented by arrow 2*x*).

More specifically, starting at the client application connection, an abstraction layer may detect the dialect of the SQL. A correct dialect of the SQL is identified using the methods described above. If no entry is found, the process may be recursively repeated at each of the child levels. If no entry is found even after expanding the whole process, it may create a transpilation service to create a key and format for the corresponding subtree. Later on, as and when a key corresponding to the subtree is found, it may use the transpilation created format. From there, the translated query may be seamlessly passed to the subsequent warehouse for execution. Results may be seamlessly returned to the client application as though they were executed on the legacy data platform.

Accordingly, a back-end data platform may be abstracted from the client application to: 1) enable the client to seamlessly connect to new data platforms without changing their current query logic nor connectivity protocol; 2) remove location constraints by implementing a lookup table with a small footprint; 3) integrate the abstraction layer to look up and translate query logic from a legacy data platform or warehouse to a new one being evaluated or selected for use; and 4) zero out the considerable cost of integration and logic translation to take advantage of new data platforms as they become available.

Figure 5:
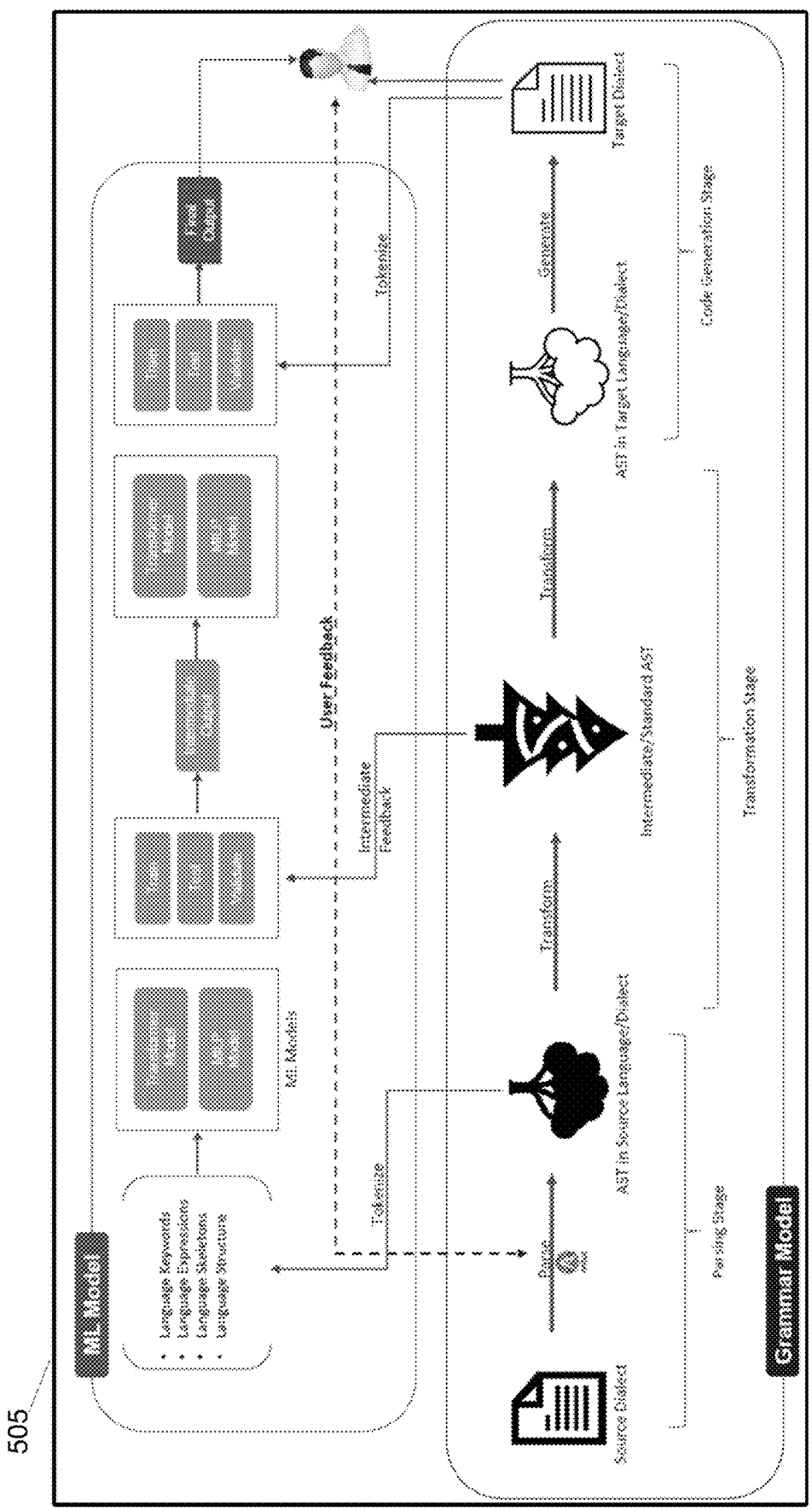
FIG. 5 depicts an illustrative diagram for a machine learning and grammar model based multidialect machine interpretable language transpiler in accordance with one or more example embodiments.

FIG. 5 provides an illustrative diagram for a machine learning and grammar model based multidialect machine interpretable language transpiler in accordance with one or more example embodiments. Data migration and transformation projects may require adoption of new technologies, and in the process, may require massive efforts in code and logic conversion. SQL is a common language used in applications to code business and reporting logic. It also may exist in many dialects, which may be either proprietary or open source. Typically, a migration effort from one SQL technology to another may involve months of careful code conversion and testing. In some instances, this time and effort may outweigh the potential benefits of migration. Probabilistic machine learning techniques may be used and a custom grammar may be built to interpret a source SQL dialect and build a target dialect to support automatic conversion of dialects and therefore the business logic contained in them. Doing so may obviate the need to develop and test single purpose custom conversion code that may otherwise be needed for a particular migration effort.

This problem may be simplified as a language translation problem. Although machine languages and natural languages may share a common concept of a "grammar," they may be different in the ways they are interpreted and therefor translation or transpilation may be used to simplify verbiage.

A two-fold approach is provided that combines the robust methodology of use-case based lexer-parser methods with machine learning models. These may be referred to as a grammar based model and a machine learning based model respectively.

Overall, the grammar based model may get the input and the intermediate state input for the ML based model, and a user may (in some instances) perform a feedback generator role. The human-in-the-loop may be eventually replaced with an automated harness that may successfully compile a target dialect query and provide real-time feedback on syntax and sematic correctness.

As illustrated in diagram 505, the process may start with a source dialect query being tokenized and separated into its language specific keyword and expressions and variables and parameters contained in them. The variables may be stored in a lookup table for future use when needed. The source language expressions may be streamed as an input into an ensemble machine learning model that may include a language transformer model and a NLP model modified to process machine interpretable language (MIL), that is, an MILP model. In the grammar model, the source dialect may be parsed deterministically using very robust and evolving grammar, thus transforming the source into an intermediate ANSI parsed tree. Like ANSI, any source language may be converted to its abstract syntax tree (AST) that formally describes the operations contained in the language. Collectively these operations may create meaning that may be understood by a computer, and a subsequent output may be fetched.

The intermediate standard form may be tokenized and used for train-test pairs to generate an intermediate output in the ML model. Subsequently, the grammar model may transform the intermediate standard representation into a representation of the required target language or dialect. These may be achieved via a set of transformer functions that implement one or more implicit rules on how to go from an intermediate standard to the parsed tree of a target dialect. The parsed tree may then be traversed to generate a well formed query in the target language or dialect. This generated query may be expected to compile and run in a target database technology. This may be provided to a user to conform to the human-in-the-loop centric design, which may alternatively be replaced by an automatic harness.

The grammar generated target dialect may be tokenized to form the test-train dataset for the final model that generates the ML model based final output, which may then be tested in the target database technology.

Accordingly, one or more aspects of the disclosure provide: 1) a hybrid approach to leverage both grammar based and transformer models for machine interpretable language processing; 2) a user feedback based evolving grammar model; 3) a highly versatile design that may incorporate multiple languages that can support many-to-many language transpilation service; and 4) a human in the loop centered design for transpilation.

Figure 6:
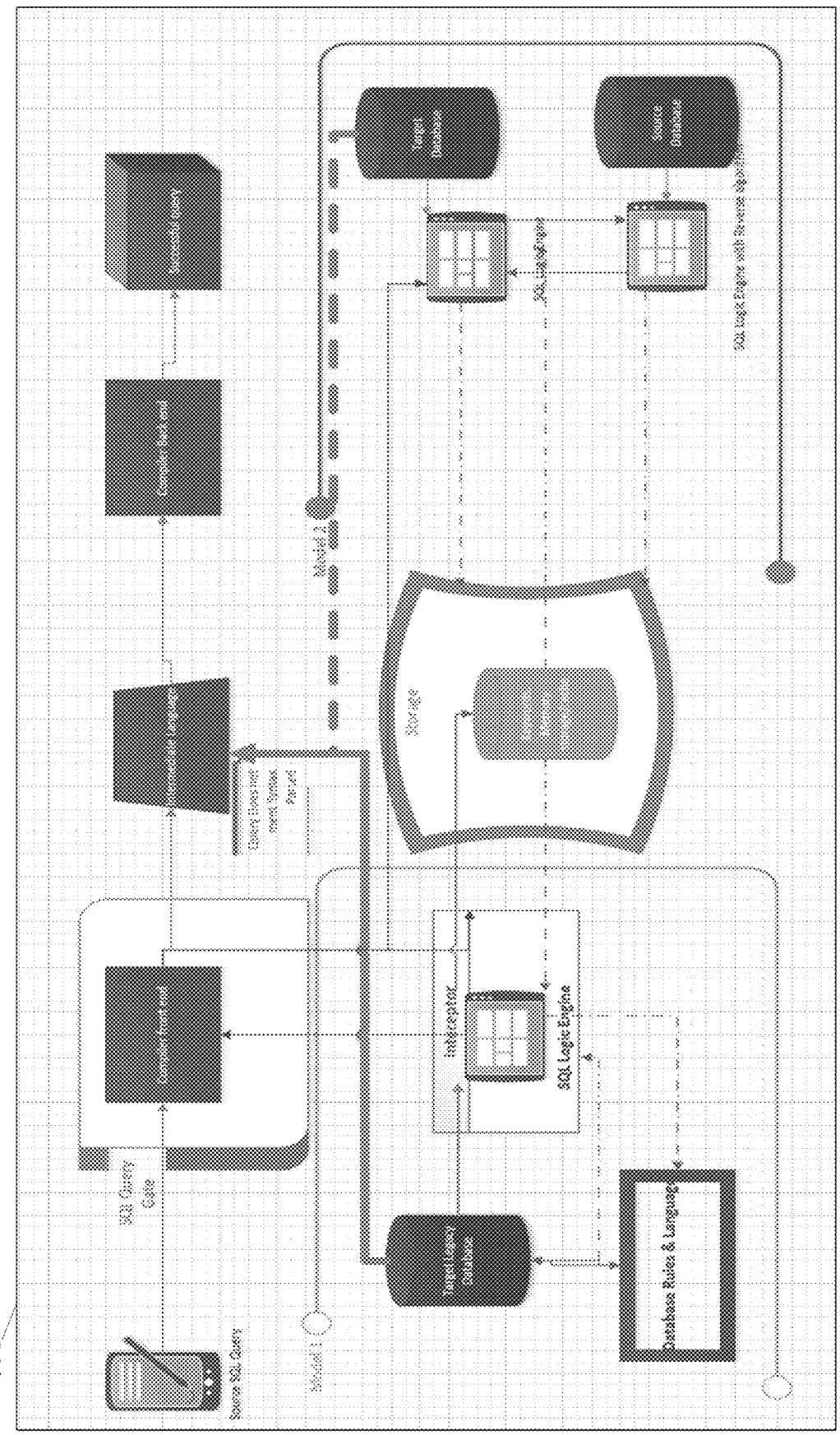
FIG. 6 depicts an illustrative diagram for a smart dynamic reversal SQL engine in accordance with one or more example embodiments.

FIG. 6 includes an illustrative diagram for a smart dynamic reversal SQL engine in accordance with one or more example embodiments described herein. For example, a system and method for facilitating migration of databases supporting querying one or more data sources is described (and illustrated in diagram 605 of FIG. 6). This system may provide mechanisms to enable the system to handle querying data and creating or updating rules on the database to support data extraction. Capabilities of the SQL dynamic reversal engine may be used to generate complex SQL queries for any target database, hence reducing the extraneous amount of hours of converting legacy SQL queries to target SQL queries, which might not be supported by vendors. This system may enable any queries that extend beyond those defined by a source or target data model syntax.

As shown in diagram 605, this smart dynamic reversal SQL engine may be implemented as one or more of the RDBS database layers/servers that may intercept queries before they are processed or parsed to the compiler of any specific database target during migration. The smart dynamic reversal SQL engine may be structured to perform a complete SQL language syntax validation, which may include all the keywords that are needed for a query to successfully retrieve accurate data from the source database. The smart dynamic reversal SQL engine may be cultivated with all different database languages and keywords as a source of reference for both ANSI and non-ANSI SQL, and it may have the capability of writing new rules and language to a target database if the query sent does not match or meet the language dialect or syntax of that database.

These concepts may be implemented to solve the learning curve of different SQL languages and writing new code for any database that halts down any database migration on platforms that do not support ANSI SQL standards. An alignment-based technique may mitigate and even overcome the inability of current databases to translate different queries that are not in their database syntax.

The smart dynamic reversal SQL engine may include one or more logic engines and one or more storage memories, which may store rules or instructions and a capabilities model. On the first linear model, the SQL logic engine may be both connected to the old databases and the new database through a secured network channel where by the two engines may communicate with each other through an API. Through that model, if a query submitted does not match the SQL syntax of the target database, the SQL logic engine may re-submit that SQL call to the source database and execute the query to get the data. Once the data has been acquired, the engine may store the data temporally on cache for the other logic engine at the target database to access/review the data. The SQL logic engine may perform one reversal regulatory algorithm function that may return a model scan given the data set in question, which may return a similar SQL query for the data set on the target database tables, thus resulting in a new query that may be provided to the application or the user and stored for further execution.

On the second model, if the source database does not exist, the SQL logic engine may review the target SQL query syntax with the source syntax and generate a rule syntax on the target database for the database to accept the new syntax and validate the query for processing. Each time new rules and syntax is created on the database, it may be stored both on the smart dynamic reversal SQL engine and on the database server.

Accordingly, the SQL engine may automatically execute a reverse engineering capability to generate an equivalent query based on the first mode, and may have the ability to override the database language to accept new syntax language from another database for query execution.

Figure 7A:
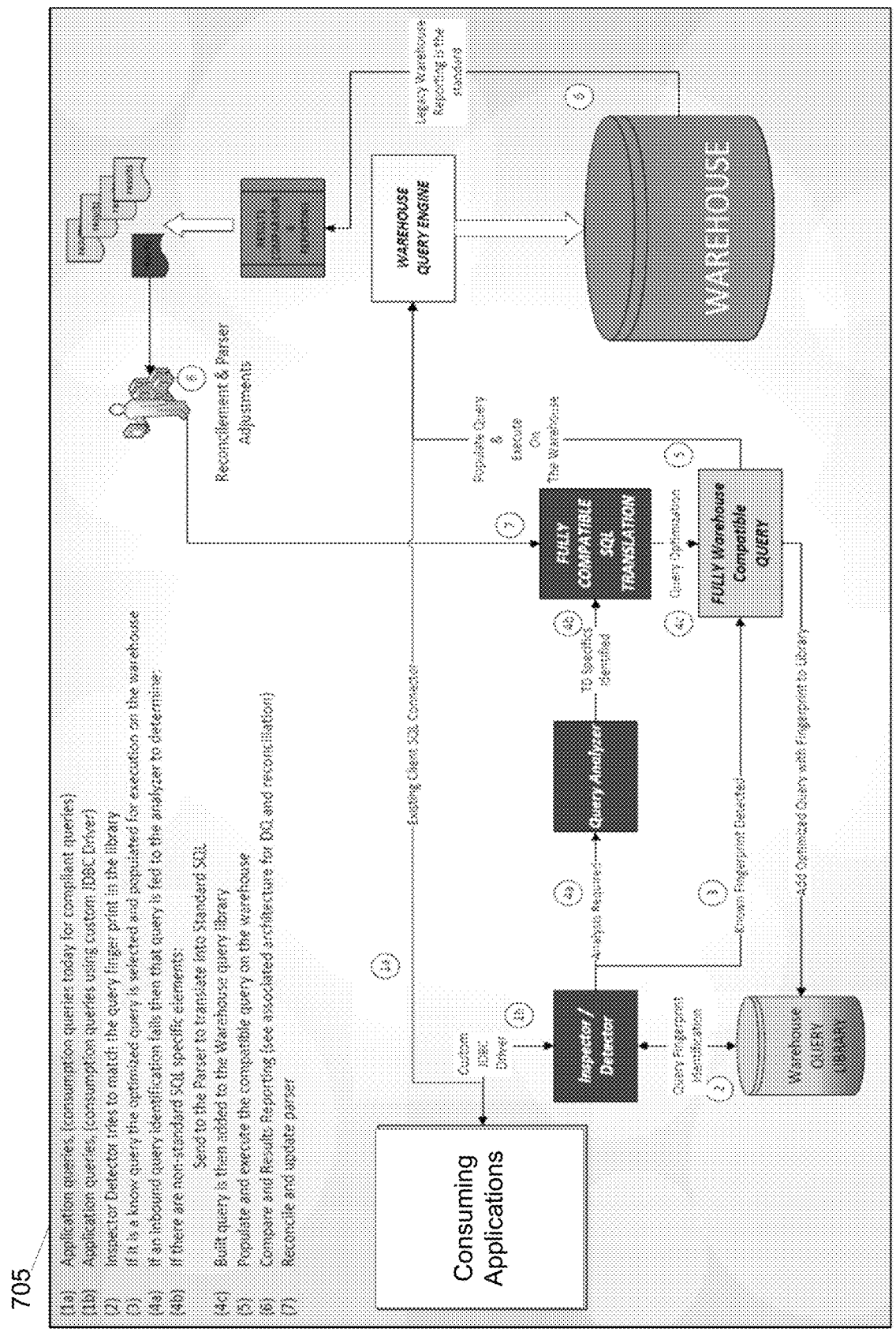
FIGS. 7A-7B depict a query translator architecture in accordance with one or more example embodiments.
Figure 7B:
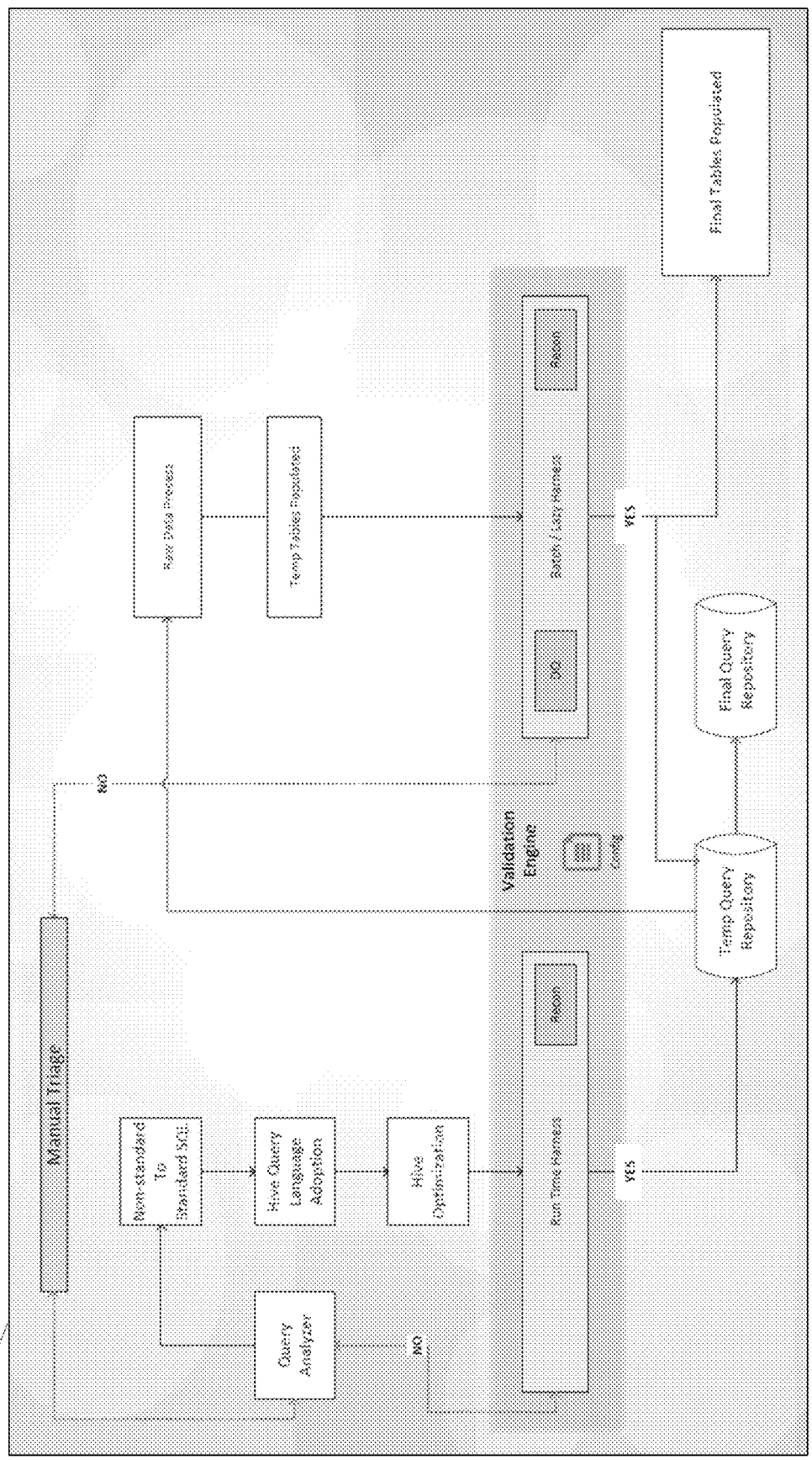

FIGS. 7A-7B depict a query translator architecture in accordance with one or more example embodiments. Today, client software for data platform consumption may be meticulously configured, tested, and adapted for specific tools used for data analysis, AI, and/or machine learning. Moreover, consuming applications (e.g., client software) may have finite and specific data platforms that are supported. Once configured, tested, and adapted, the consuming applications might not easily nor readily adopt an alternative data platform due to specific differences in protocols, query languages, general nuanced differences that may impair and/or impact that adoption.

One or more aspects of the disclosure provide a system architecture that may completely abstract client software and applications from the data platforms that supply the data (e.g., tables, records, columns, semi-structured, unstructured, and/or other data), such that the client may have true platform independence. At the start, the architecture may be client agnostic. Any existing interface connectivity or known common network protocol that pre-exists may be cared for (e.g., Java data base connectivity, open data base connectivity, and/or other protocols). The original client stream may be captured and inspected against previously known patterns. If the pattern is recognized, a lookup table may be utilized to obtain the equivalent alternative data platform compatible query. If the query is not recognized, a real-time query analyzer and fully compatible SQL translator (as described above), may be invoked. The real-time translation may be used as a query against the new data platform. Further reconcilement and data quality analysis of the results may be performed to ensure that the results provided mirror what would have otherwise been expected from the legacy data platform. Any adjustments to the query to further optimize or match the results may also be anticipated and enabled by the system architecture to ensure that only fully certified warehouse compatible queries are added back into the warehouse query library.

These concepts are further illustrated in diagrams 705 and 710, which are shown in FIGS. 7A-7B. For example, consumption queries for compliant queries may be represented by arrow 1a and consumption queries using a customer JDBC driver may be represented by arrow 1b. The inspector/detector system may try to match the query fingerprint in the warehouse/query library (as represented by arrow 2). If the query fingerprint is known, the optimized query may be selected and populated for execution on the warehouse (as represented by arrow 3). If an inbound query identification fails, then that query may be fed to the analyzer (as shown by arrow 4a) to determine if there are non-standard SQL specific elements, which may be sent to the parser for translation into standard SQL (as represented by arrow 4b). The built query may then be added to the warehouse query library (as shown by arrow 4c). The compatible query may be populated and executed on the warehouse (as represented by arrow 5), and the results may be compared/reported (as represented by arrow 6). The results may then be reconciled and parser adjustments may be made accordingly (as represented by arrow 7).

In doing so, this system may provide seamless protocol and interface agnostic client connectivity with a constant time query translation table capability in addition to the real-time on the fly SQL parsing and multi-dialect SQL query translation to enable full data platform abstraction.

Figure 8:
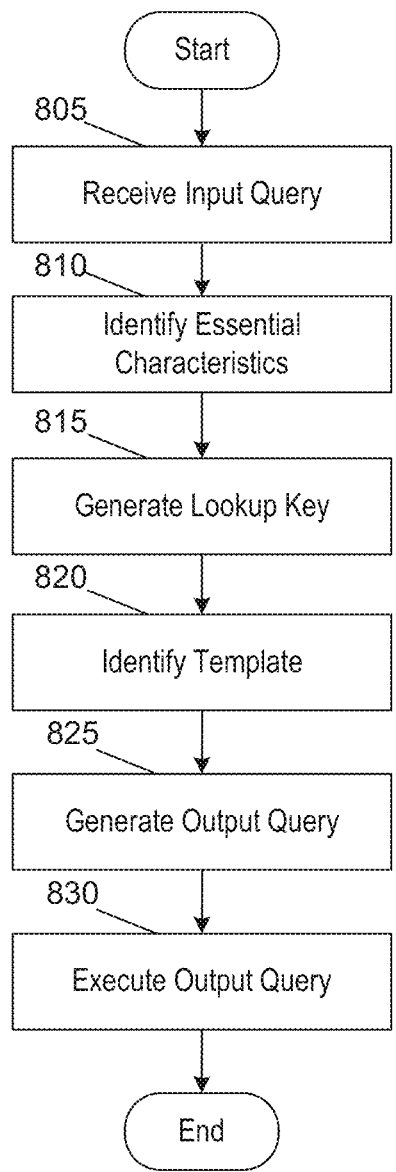
FIG. 8 depicts an illustrative method for performing efficient transliteration of machine interpretable languages in accordance with one or more example embodiments.

FIG. 8 depicts an illustrative method for performing efficient transliteration of machine interpretable languages in accordance with one or more example embodiments. Referring to FIG. 8, at step 805, a computing platform having at least one processor, a communication interface, and memory may receive an input query composed in a first machine language. At step 810, the computing platform may identify essential characteristics of the input query. At step 815, the computing platform may generate a lookup key using the essential characteristics of the input query. At step 820, the computing platform may identify, using the lookup key and a lookup table, a pre-formatted template composed in a second machine language. At step 825, the computing platform may reconstruct the input query in the second machine language by inputting non-essential parameters of the input query into the identified pre-formatted template, which may generate an output query. At step 830, the computing platform may execute the output query.

Figure 9A:
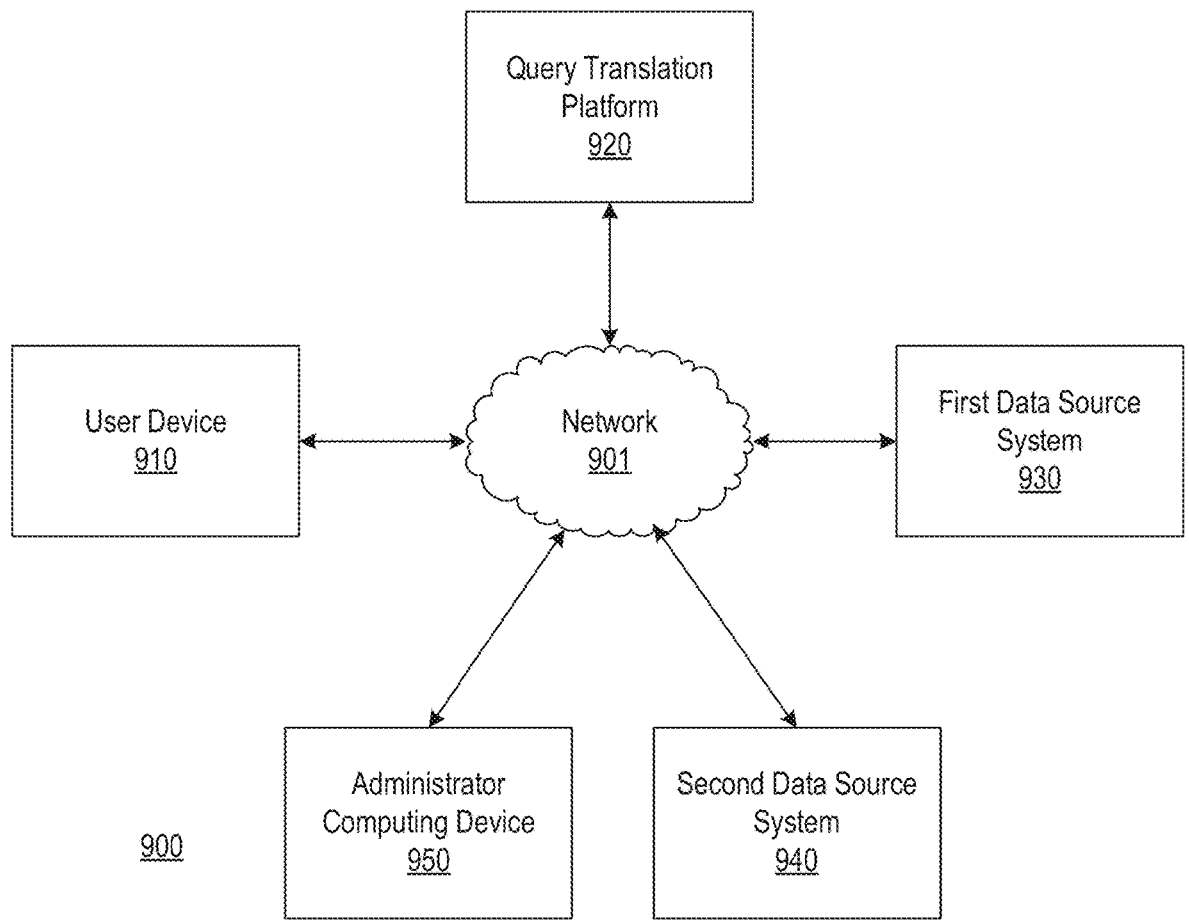
FIGS. 9A-9B depict an illustrative computing environment for performing efficient transliteration of machine interpretable languages in accordance with one or more example embodiments.
Figure 9B:
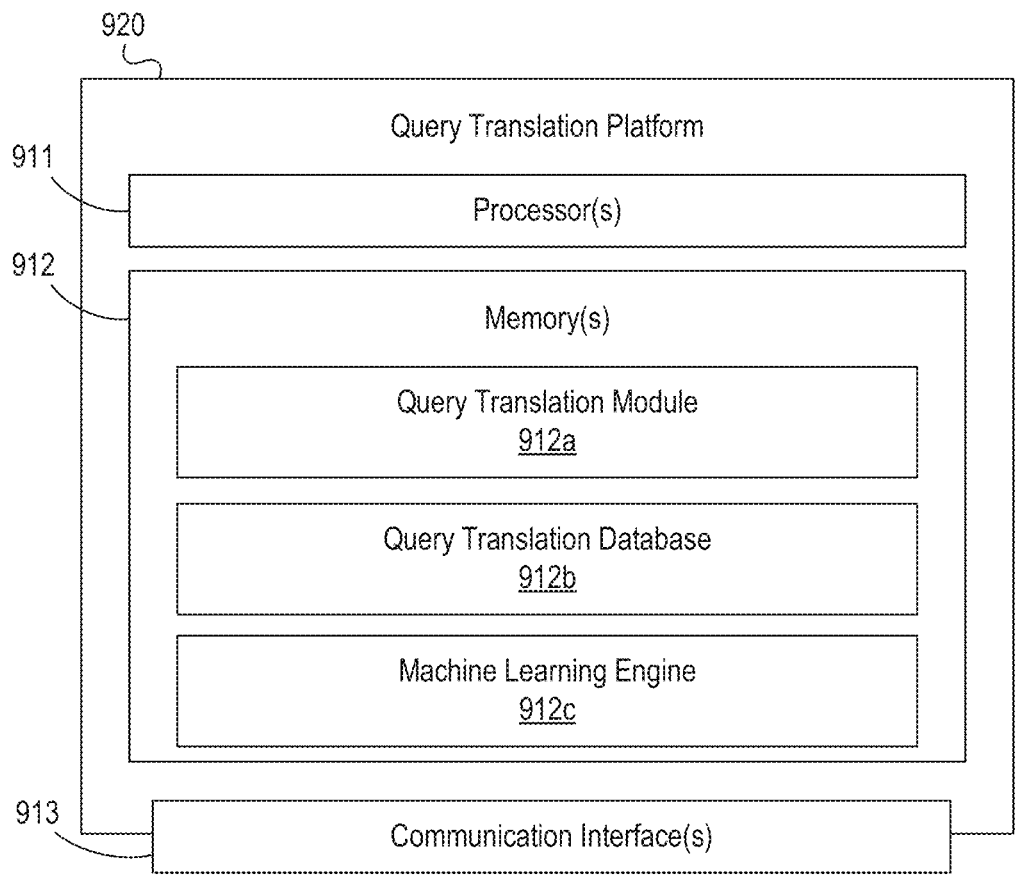

FIGS. 9A-9B depict an illustrative computing environment for performing efficient transliteration of machine interpretable languages in accordance with one or more example embodiments. Referring to FIG. 9A, computing environment 900 may include one or more computer systems. For example, computing environment 900 may include user device 910, query translation platform 920, first data source system 930, second data source system 940, and administrator computing device 950.

User device 910 may be and/or otherwise include a laptop computer, desktop computer, mobile device, tablet, smartphone, and/or other device that may be used by an individual to access a client application (that may e.g., be configured to transmit data queries). In some instances, user device 910 may be configured to display one or more user interfaces (e.g., query response interfaces, or the like). Although a single user device 910 is shown, any number of user devices may be deployed in the systems/methods described below without departing from the scope of the disclosure.

As described further below, query translation platform 920 may be a computer system that includes one or more computing devices (e.g., servers, server blades, or the like) and/or other computer components (e.g., processors, memories, communication interfaces) that may be used to provide query translation, query responses, and/or database migration services as described further below. In these instances, the query translation platform 920 may be configured with a custom driver configured to intercept database queries (e.g., from client applications running on, for example, the user device 910) to provide the translation, response, and/or migration services.

First data source system 930 may be one or more computing devices (e.g., servers, server blades, and/or other devices). In some instances, the first data source system 930 may be configured to store data in a first format (e.g., a source format). In some instances, the first data source system 930 may be configured to store data to be migrated to a second format (e.g., a target format corresponding to the second data source system 940).

Second data source system 940 may be one or more computing devices (e.g., servers, server blades, and/or other devices). In some instances, the second data source system 940 may be configured to store data in the second format. In these instances, the second data source system 940 may be configured to store data that has been migrated from the first format (e.g., the source format of the first data source system 930).

Administrator computing device 950 may be and/or otherwise include a laptop computer, desktop computer, mobile device, tablet, smartphone, and/or other device that may be used by an individual to initiate or otherwise request a database migration (e.g., from the first data source system 930 to the second data source system 940). In some instances, the administrator computing device 950 may be operated by a system administrator, network administrator, and/or other employee of an enterprise organization corresponding to the query translation platform 920, the first data source system 930, and/or the second data source system 940.

Computing environment 900 also may include one or more networks, which may interconnect user device 910, query translation platform 920, first data source system 930, second data source system 940, and/or administrator computing device 950. For example, computing environment 900 may include a network 901 (which may interconnect, e.g., user device 910, query translation platform 920, first data source system 930, second data source system 940, and/or administrator computing device 950).

In one or more arrangements, user device 910, query translation platform 920, first data source system 930, second data source system 940, and/or administrator computing device 950 may be any type of computing device capable of sending and/or receiving requests and processing the requests accordingly. For example, user device 910, query translation platform 920, first data source system 930, second data source system 940, administrator computing device 950 and/or the other systems included in computing environment 900 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user device 910, query translation platform 920, first data source system 930, second data source system 940, and/or administrator computing device 950 may, in some instances, be special-purpose computing devices configured to perform specific functions.

Referring to FIG. 9B, query translation platform 920 may include one or more processors 911, memory 912, and communication interface 913. A data bus may interconnect processor 911, memory 912, and communication interface 913. Communication interface 913 may be a network interface configured to support communication between query translation platform 920 and one or more networks (e.g., network 901, or the like). Memory 912 may include one or more program modules having instructions that when executed by processor 911 cause query translation platform 920 to perform one or more functions described herein and/or one or more databases that may store and/or otherwise maintain information which may be used by such program modules and/or processor 111. In some instances, the one or more program modules and/or databases may be stored by and/or maintained in different memory units of query translation platform 920 and/or by different computing devices that may form and/or otherwise make up query translation platform 920. For example, memory 912 may have, host, store, and/or include query translation module 912a, query translation database 912b, and/or machine learning engine 912c.

Query translation module 912a may have instructions that direct and/or cause query translation platform 920 to provide improved database query translation and database migration, as discussed in greater detail below. Query translation database 912b may store information used by query translation module 912a and/or query translation platform 920 in application of advanced techniques to provide improved database query translation, database migration, and/or in performing other functions. Machine learning engine 912c may be used by the query translation module 912a and/or the query translation platform 920 to train, maintain, and/or otherwise refine translation model that may be used to provide enhanced database query translation and/or migration.

Figure 10A:
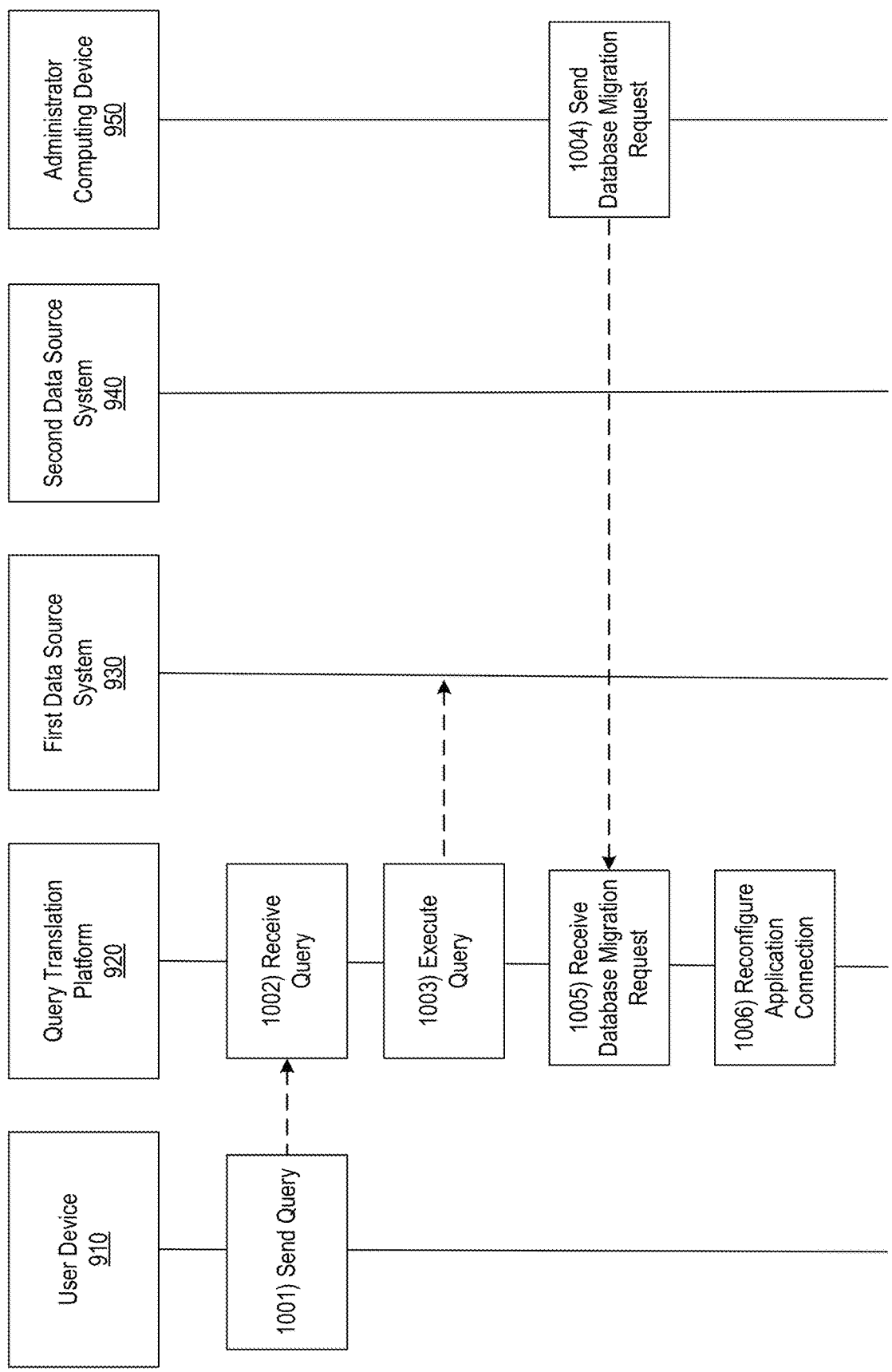
FIGS. 10A-10C depict an illustrative event sequence for performing efficient transliteration of machine interpretable languages in accordance with one or more example embodiments.
Figure 10B:
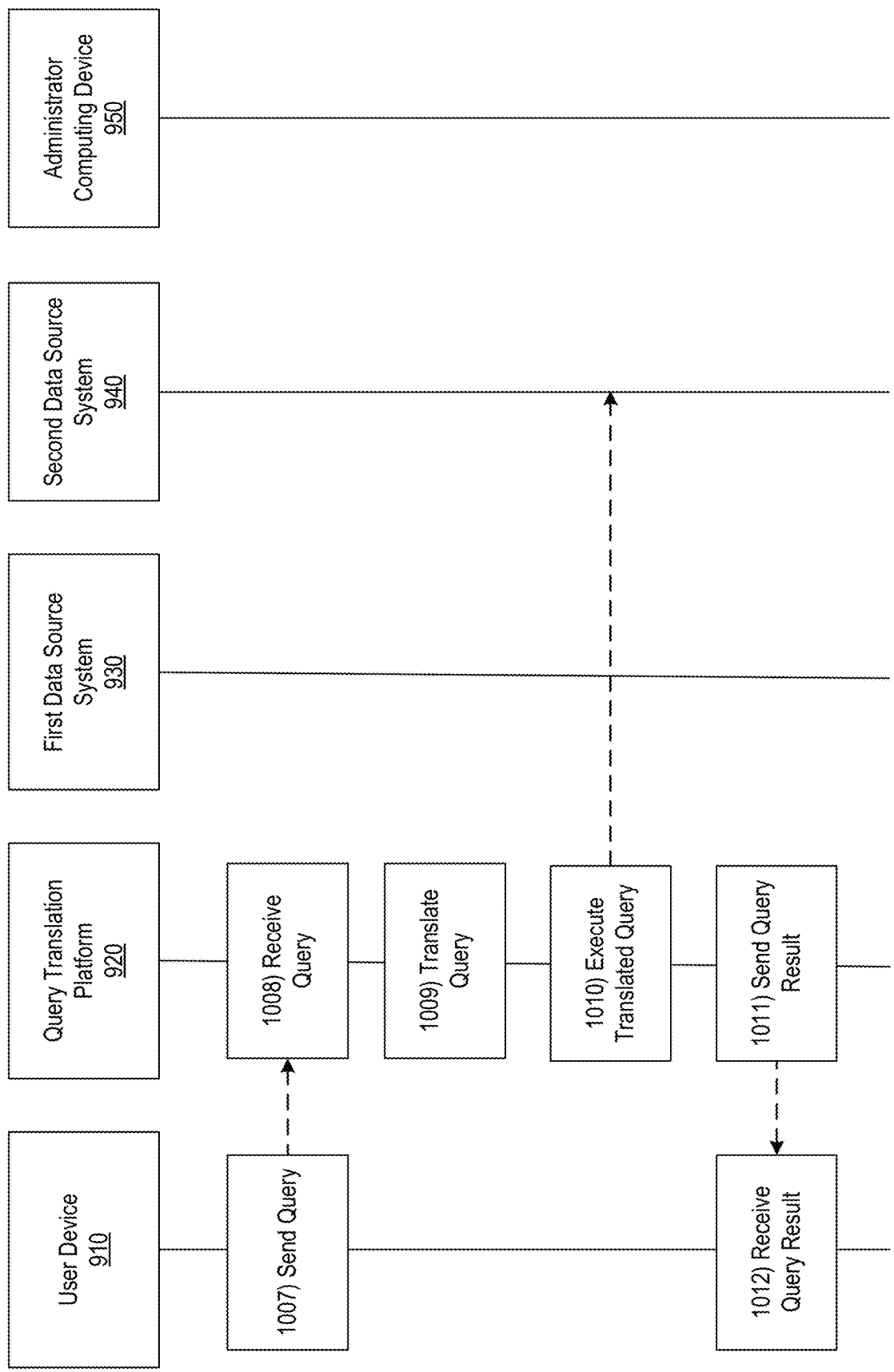
Figure 10C:
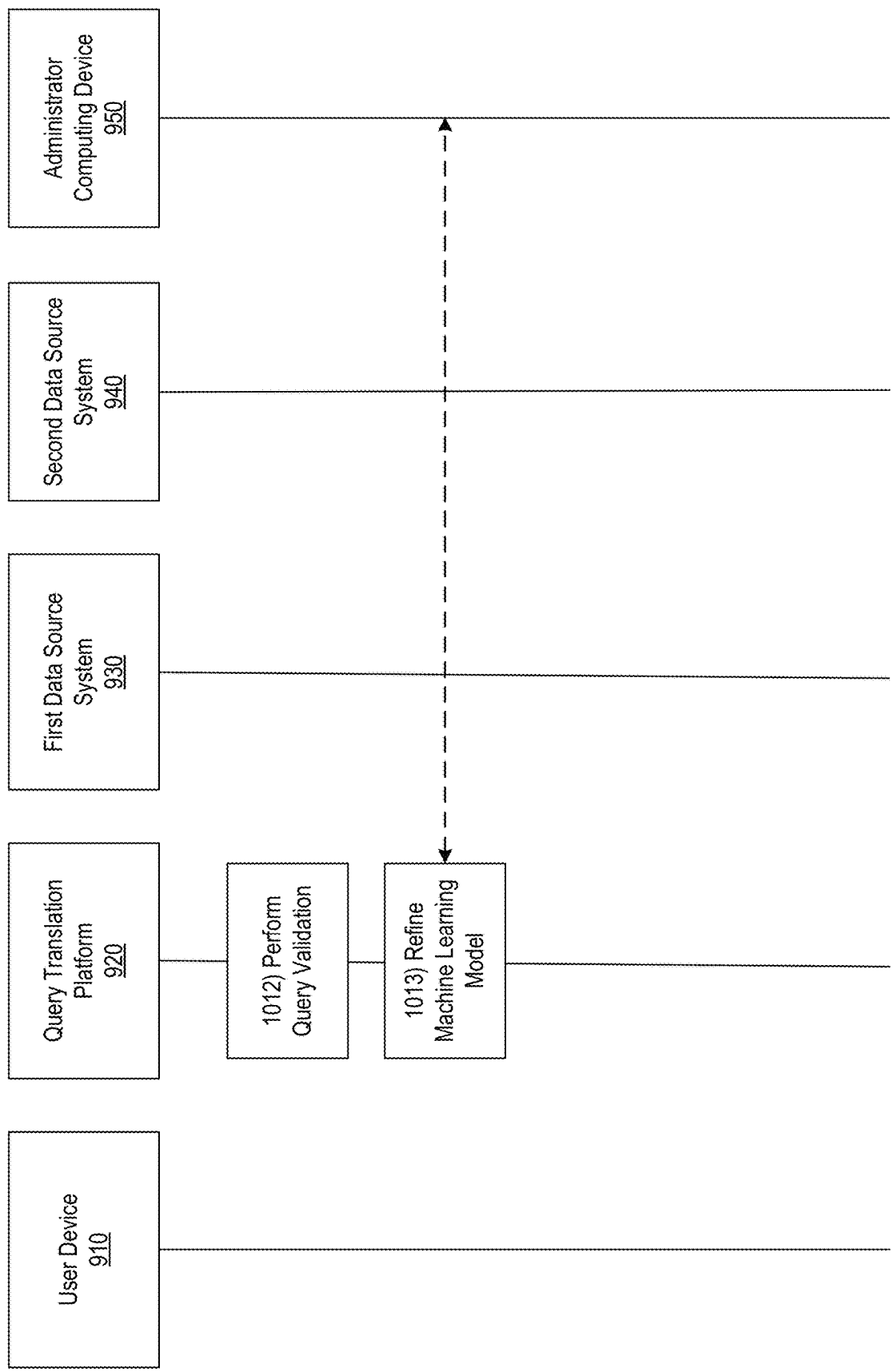

FIGS. 10A-10C depict an illustrative event sequence for performing efficient transliteration of machine interpretable languages in accordance with one or more example embodiments. Referring to FIG. 10A, at step 1001, the user device 910 (e.g., a client application running on the user device 910) may send a first database query (which may be formatted in a first format corresponding to the first data source system 930) to the query translation platform 920 (e.g., while a wired or wireless data connection is established). At step 1002, the query translation platform 920 may receive the first database query, sent at step 1001. At step 1003, because the first database query is correctly formatted for execution on the first data source system 930, the query translation platform 920 may execute the first database query on the first data source system 930. In some instances, this may produce a first query result, which may be returned to the user device 910.

At step 1004, the administrator computing device 950 may send a database migration request (e.g., while a wired or wireless data connection is established), which may request migration of data stored in a first format at the first data source system 930 into a second format for storage at the second data source system 940. At step 1005, the query translation platform 920 may receive the database migration request sent at step 1004. Actions performed at step 1005 are described further below with regard to FIG. 14 (see e.g., step 1405). At step 1006, the query translation platform 920 may reconfigure a connection of the client application (e.g., running at the user device 910) to direct further database queries through an abstraction layer and/or custom driver of the query translation platform 920. Actions performed at step 1006 are described further below with regard to FIGS. 11 and 14 (see e.g., steps 1105 and 1410).

Referring to FIG. 10B, at step 1007, the user device 910 (e.g., the client application) may send a second database query to the query translation platform 920 (e.g., while a wired or wireless data connection is established), which may once again be formatted in the first format for execution on the first data source system 930. At step 1008, the query translation platform 920 may receive the second database query sent at step 1007 and may intercept the second database query at the abstraction layer and/or custom driver prior to routing the second database query for execution on a database. Actions performed at step 1008 are described further below with regard to FIGS. 11-14 (see e.g., steps 1110, 1205, 1305, and 1415-1420).

At step 1009, the query translation platform 920 may translate the second database query from the first format of the first data source system 930 to a second format of the second data source system 940. Actions performed at step 1009 are described further below with regard to FIGS. 11-14 (see e.g., steps 1115, 1210-1230, 1310-1330, and 1425).

At step 1010, the query translation platform 920 may execute the translated database query on the second data source system 940 to produce a query result. Actions performed at step 1010 are described further below with regard to FIGS. 11-14 (see e.g., steps 1120, 1235, 1335, and 1430).

At step 1011, the query translation platform 920 may send (e.g., while a wired or wireless data connection is established) the query result to the user device 910 (e.g., to the client application). Actions performed at step 1011 are described further below with regard to FIGS. 11 and 14 (see e.g., steps 1125 and 1435). At step 1012, the user device 910 may receive the query result sent at step 1011.

Referring to FIG. 10C, at step 1012, the query translation platform 920 may perform query validation. Actions performed at step 1012 are described further below with regard to FIG. 15. At step 1013, the query translation platform 920 may refine a machine learning model used to produce the translated queries (which may, in some instances, involve communication with the administrator computing device 950). Actions performed at step 1013 are described further below with regard to FIG. 16.

Although steps 1001-1013 are shown in a particular order in FIGS. 10A-10C, this is for illustrative purposes only, and these steps may be performed in alternative orders without departing from the scope of the disclosure.

Figure 11:
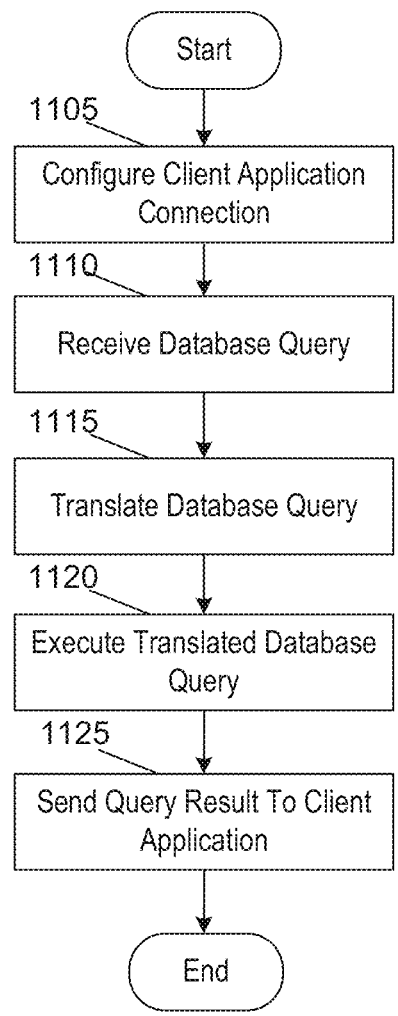
FIGS. 11-16 depict illustrative methods for performing efficient transliteration of machine interpretable languages in accordance with one or more example embodiments.

FIG. 11 depicts an illustrative method for performing efficient transliteration of machine interpretable languages within a computing architecture in accordance with one or more example embodiments. At step 1105, a computing platform (such as the query translation platform 920) may configure a client application (e.g., running on a user device such as the user device 910) to transmit database queries to a custom driver, integrated into the query translation platform 920. In these instances, other functionality of the client application might not be modified, and the reconfiguration may be seamless or otherwise unnoticed by a user of the client application.

At step 1110, the query translation platform 920 may receive an input database query from the client application. For example, the query translation platform 920 may receive an input database query formatted in a first format (e.g., a source format) corresponding to a first database (e.g., the first data source system 930). In these instances, the query translation platform 920 may utilize the custom driver to intercept the input database query prior to routing the input database query for execution on a database. For example, in receiving the input database query, the query translation platform 920 may receive a query formatted in a machine interpretable language such as C, C++, Python, SQL, and/or other machine interpretable languages. In these examples, the query translation platform 920 may receive a query that includes essential parameters (e.g., keywords, symbols, and/or other parameters) and non-essential parameters (specific columns, rows, data ranges, letter case, spaces, tabs, new lines, and/or other parameters).

At step 1115, the query translation platform 920 may translate the input database query from the first format to a second format (e.g., a target format corresponding to a second database (e.g., the second data source system 940)). For example, the query translation platform 920 may translate the input database query using an efficient transliteration process (e.g., as described with regard to FIG. 12), a recursive transliteration process (e.g., as described with regard to FIG. 13), and/or a transpilation process (e.g., as described with regard to FIG. 16). In some instances, the query translation process may perform such translation as a result of a database migration (e.g., migrating data stored in the source format at the first data source system 930 to the second data source system 940 in the target format). Rather than causing the user device 910 or the client application to be reprogrammed to generate queries in the target format, the query translation platform 920 may be configured to translate database queries (such as the input database query) from the source format to the target format for seamless execution on the second data source system 940/target format. For example, many client applications may rely on data stored at the first data source system 930, and thus the query translation platform 920 may translate the data without re-engineering all of these client applications (which may, for example, consume significant time and computer processing resources, and/or introduce many possibilities for error and inefficiency).

In some instances, the query translation platform 920 may perform the translation in response to or based on occurrence of a data migration. For example, an enterprise organization may migrate data from a first format (stored at a first location/warehouse) to a second format (stored at a second location/warehouse). As a result, client applications configured to produce queries in the first format may otherwise be unable to execute queries against the second warehouse without otherwise rewriting the queries.

In some instances, to perform the translation, the query translation platform 920 may trap the database queries at the point of execution rather than causing client applications to rewrite the queries. For example, the query translation platform 920 may cause client applications to point to a custom driver (or driver wrapper) configured for query translation rather than a previous driver.

In some instances, the query translation platform 920 may use a query translation library to perform the translation. For example, the query translation platform 920 may identify that most source database queries fit into a few standard formats or patterns, and may use these standard formats/patterns to identify corresponding output/translated queries in the target format. By implementing the query translation library, the query translation platform 920 may perform a lookup function based on a format of a database query to quickly identify a translated query. For example, the query translation platform 920 may remove non-essential parameters from the database queries and replace them with a digital value (e.g., a number or other value), which may result in a query key (which may, e.g., correspond to one of the standard formats). The query translation platform 920 may preload these query keys (which may, e.g., be structured queries without non-essential information and which may be pre-verified) into the query translation library along with output/translated queries corresponding to the query keys. In some instances, in performing the translation, the query translation platform 920 may execute the lookup function as described further below with regard to FIGS. 12 and 13. Such a method may have two primary technical advantages over other translation methods. First, the speed of translation may be increased. For example, by executing a lookup function to identify a matching query key, the query translation platform 920 may avoid inefficiencies and/or other processing delays caused by the use of other language processing techniques in translation. Second, the translated queries stored in the query translation library may be pre-verified (as described below with regard to FIGS. 15 and 16), and thus accuracy of the output/translated queries may be ensured. In some instances, if the query translation platform 920 is not successful in identifying an output database query using the lookup function, a real time translation may be performed (e.g., which may be similar to the transliteration process described below with regard to FIG. 16).

In some instances, in translating the database queries, the query translation platform 920 may translate the database queries to a different machine interpretable language (e.g., C, C++, Python, SQL, and/or other machine interpretable languages). In some instances, because the translated queries are formatted in a machine interpretable language, they might not be configured to tolerate error (e.g., in formatting, language, spelling, or otherwise). In some instances, such translation may be performed by the query translation platform 920 in real time.

In some instances, the query translation platform 920 may identify that the database query is already formatted for execution on the second data source system 940. In these instances, the query translation platform 920 may execute the database query on the second data source system 940 (e.g., proceed to step 1120) without performing the above described translation.

At step 1120, once the input database query has been translated, the query translation platform 920 may execute the translated database query on the second data source system 940 to produce a query result. At step 1125, the query translation platform 920 may return the query result to the client application. This query translation architecture is further depicted above with regard to FIGS. 7A-7B and their corresponding description.

Figure 12:
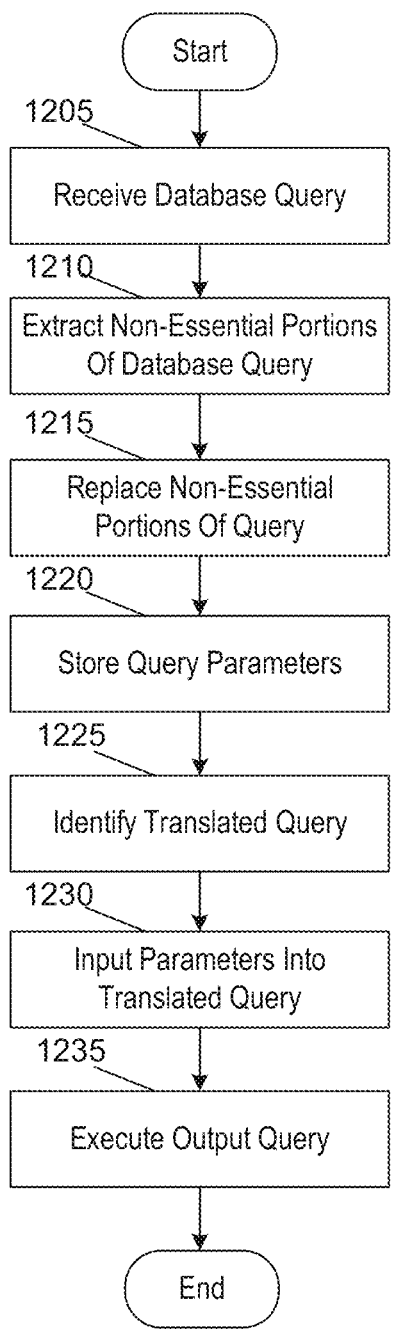

FIG. 12 depicts an illustrative method for performing efficient transliteration of machine interpretable languages in accordance with one or more example embodiments. For example, the method illustrated in FIG. 12 may, in some instances, be performed using or within the architecture described with regard to FIG. 11. At step 1205, a computing platform (such as the query translation platform 920) may receive a database query from a client application executing at a user device (e.g., user device 910). For example, as described above with regard to step 1105, the query translation platform 920 may receive a query formatted in a first format (e.g., a source format) corresponding to a first database (e.g., first data source system 930). In these instances, the query translation platform 920 may utilize a custom driver to intercept the database query prior to routing the database query for execution on a database. For example, the method shown in FIG. 12 may be performed once the client application has been configured to direct database queries to the custom driver as described above in step 1105.

At step 1210, the query translation platform 920 may extract non-essential portions of the database query. For example, the query translation platform 920 may extract cases and/or instances of keywords, spaces, tabs, newlines, and/or other non-essential parameters, and might not extract ordering, word locations, formatting, and/or other essential parameters. For example, as illustrated in FIG. 2B, the database query may be "select * FROM students WHERE class_id=XYZ" and the query translation platform 920 may remove "students," "class_id," and "XYZ," from the database query to leave only the essential portions (which may, e.g., make up and/or otherwise form the query structure: "select * FROM _____ WHERE _____=_____").

At step 1215, the query translation platform 920 may replace the extracted non-essential portions of the database query with pointers. For example, referring back to FIG. 2B and the example described above at step 1210, the query translation platform 920 may replace "students" with a first pointer "$0," "class_id" with a second pointer "$1," and "XYZ" with a third pointer "$2." In doing so, the query translation platform 920 may generate a source query key corresponding to the database query. For example, the source query key for the query may be "select*FROM$0WHERE$1=$2," as illustrated in FIG. 2B.

At step 1220, the query translation platform 920 may store the non-essential portions of the database query as query parameters. For example, the query translation platform 920 may store the query parameters along with the source query key (e.g., as a label for the source query key). In the example above, the query translation platform 920 thus may store "students," "class_id," and "XYZ" as query parameters.

At step 1225, the query translation platform 920 may perform a lookup function on a query translation library using the source query key. For example, the query translation platform 920 may maintain a lookup table that includes a plurality of source query keys (e.g., in the source dialect) and their corresponding translated queries (e.g., in the target dialect). In some instances, this may be similar to the table illustrated in FIG. 2C. Accordingly, the query translation platform 920 may identify a translated query (in the target dialect) that corresponds to the source query key (in the source dialect). In these instances, the translated query may include pointers corresponding to the pointers in the source query key. In some instances, the query translation platform 920 may identify that the source query key does not exactly match any translated queries in the query translation table, but may identify a corresponding translated query using fuzzy matching and/or other matching techniques.

At step 1230, the query translation platform 920 may input the query parameters into the translated query. For example, the query translation platform 920 may replace the pointers in the translated query with the query parameters associated with each corresponding pointer from the source query key. For example, the query translation platform 920 may replace "$0" with "students," "$1" with "class_id," and "$2" with "XYZ." In doing so, the query translation platform 920 may produce an output query in the target dialect that corresponds to the database query in the source dialect (which may, e.g., result in a query configured for execution on the second data source system 940). In some instances, the query translation platform 920 may input the query parameters and the translated query into a reconstructor to generate the output query.

At step 1235, the query translation platform 920 may execute the output query on the second data source system 940 to produce a query result. The query translation platform 920 may then return the query result to the client application. This query translation method is further described above with regard to FIGS. 2A-2D and their corresponding descriptions.

Figure 13:
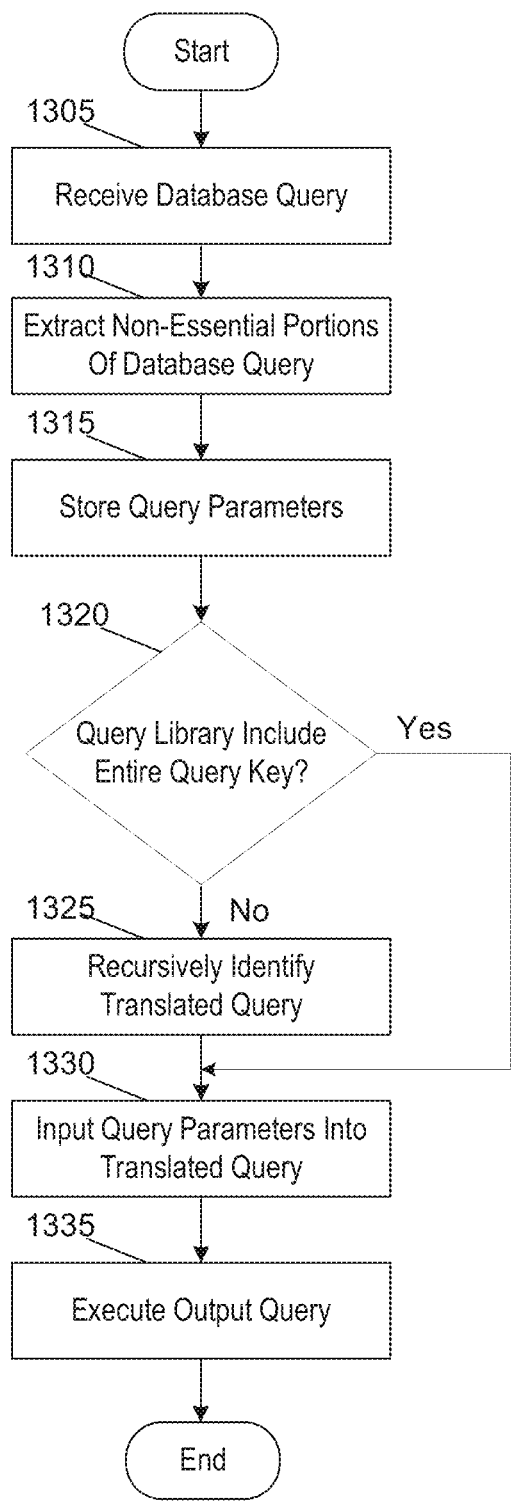

FIG. 13 depicts an illustrative method for performing recursive transliteration of machine interpretable languages in accordance with one or more example embodiments. For example, as described below, the method depicted in FIG. 13 may be similar to the transliteration method described in FIG. 12, however, the recursive transliteration method of FIG. 13 may be performed when a complete match is not identified between the source query key and a pre-verified query key stored in the query translation library. Rather, the transliteration process may operate recursively to parse and process one or more queries within a broader query to be translated, for example.

At step 1305, a computing platform (such as the query translation platform 920) may receive a database query from a client application executing at a user device (e.g., user device 910). For example, as described above with regard to steps 1105 and 1205, the query translation platform 920 may receive a query formatted in a first format (e.g., a source format) corresponding to a first database (e.g., first data source system 930). In these instances, the query translation platform 920 may utilize a custom driver to intercept the database query prior to routing the database query for execution on a database. For example, the method shown in FIG. 13 may be performed once the client application has been configured to direct database queries to the custom driver as described above in step 1105. As a particular example, the following input SQL code may be received: "SELECT abc FROM students WHERE class_id=(SELECT id FROM classes WHERE number_of_students=(SELECT MAX number_of_students FROM classes WHERE MAX number_of_TA==2))."

At step 1310, the query translation platform 920 may extract non-essential portions of the database query. For example, the query translation platform 920 may extract these query parameters in a method similar to that described above with regard to step 1210, and may replace the extracted non-essential portions of the database query with pointers as described above with regard to step 1215. In doing so, the query translation platform 920 may produce a source query key.

At step 1315, the query translation platform 920 may store the non-essential portions of the database query as query parameters. For example, the query translation platform 920 may store the query parameters along with the source query key, as in the examples discussed above.

At step 1320, the query translation platform 920 may identify whether a query translation library includes a pre-verified query key that matches the entire source query key. If the query translation platform 920 identifies that the query translation library does include a pre-verified query key that matches the entire source query key, the query translation platform 920 may proceed to step 1330 (this portion of the method may be similar to the transliteration method illustrated in FIG. 12). If the query translation platform 920 identifies that the query translation library does not include a pre-verified query key that matches the entire source query key, the query translation platform 920 may proceed to step 1325. For example, the query translation platform 920 may identify that portions of the source query key match one or more pre-verified query keys from the query translation library.

As a specific example, the query translation platform 920 may identify that although the query translation library does not include a pre-verified query key that would correspond to the source query key in its entirety, the query translation library includes the following pre-verified query keys: "SELECT$0FROM$1WHERE$2=$3" and "MAX$0," which may be used to recursively translate the database query as described below.

At step 1325, the query translation platform 920 may recursively identify the translated query as illustrated above in FIGS. 3A-3C. For example, the query translation platform 920 may recursively split the database query "SELECT abc FROM students WHERE class_id=(SELECT id FROM classes WHERE number_of_students=(SELECT MAX number_of_students FROM classes WHERE MAX number_of_TA==2))," using the pre-verified query keys illustrated in FIG. 3A and extracting parameters and creating a parse tree accordingly as illustrated in FIGS. 3B and 3C. For example, the query translation platform 920 may use a first key "SELECT$0FROM$1WHERE$2=$3" to represent "SELECT abc FROM students WHERE class_id=$$0," where "$$0" represents the remainder of the database query. The query translation platform 920 may use the key "SELECT$0FROM$1WHERE$2=$3" to represent the next portion of the database query "SELECT id FROM classes WHERE number_of_students=$$1" where "$$1" represents the remainder of the database query. The query translation platform 920 may use the key "SELECT$0FROM$1WHERE$2=$3" to represent the next portion of the database query "SELECT $$2 FROM students WHERE classes==$$3" where "$$2" and "$$3" represent "MAX number_of_students" and "MAX number_of_TA" respectively (which may then each be represented by "MAX$0"). The query translation platform 920 may store parameters for these nested source query keys as indicated in FIG. 3B.

The query translation platform 920 may then assemble a translated query in the target dialect using the nested pre-verified query keys corresponding to the nested source query keys to identify their corresponding formatted statements (e.g., as shown in FIG. 3A).

In some instances, if the query translation platform 920 is still unable to identify the translated query using the recursive transliteration, the query translation platform 920 may translate the database query on the fly in real time using the transpilation method described below with regard to FIG. 16.

At step 1330, once an overall formatted statement has been assembled, the query translation platform 920 may input the query parameters by replacing the pointers in the formatted statement to produce an output query in the target dialect that corresponds to the database query (e.g., that was in the source dialect).

At step 1335, the query translation platform 920 may execute the output query on the second data source system 940 to produce a query result. The query translation platform 920 may then return the query result to the client application. After producing the query result, the query translation platform 920 may update the query translation library to include the newly generated query key (e.g., representative of the database query in its entirety) and the corresponding translated query. In doing so, the query translation platform 920 may avoid repeating the recursive transliteration process for this particular query again if it is received in the future (which may, e.g., provide various technical benefits including conserving computer processing resources and increasing computational processing efficiency). This recursive query translation method is further described above with regard to FIGS. 3A-3C and their corresponding descriptions.

Figure 14:
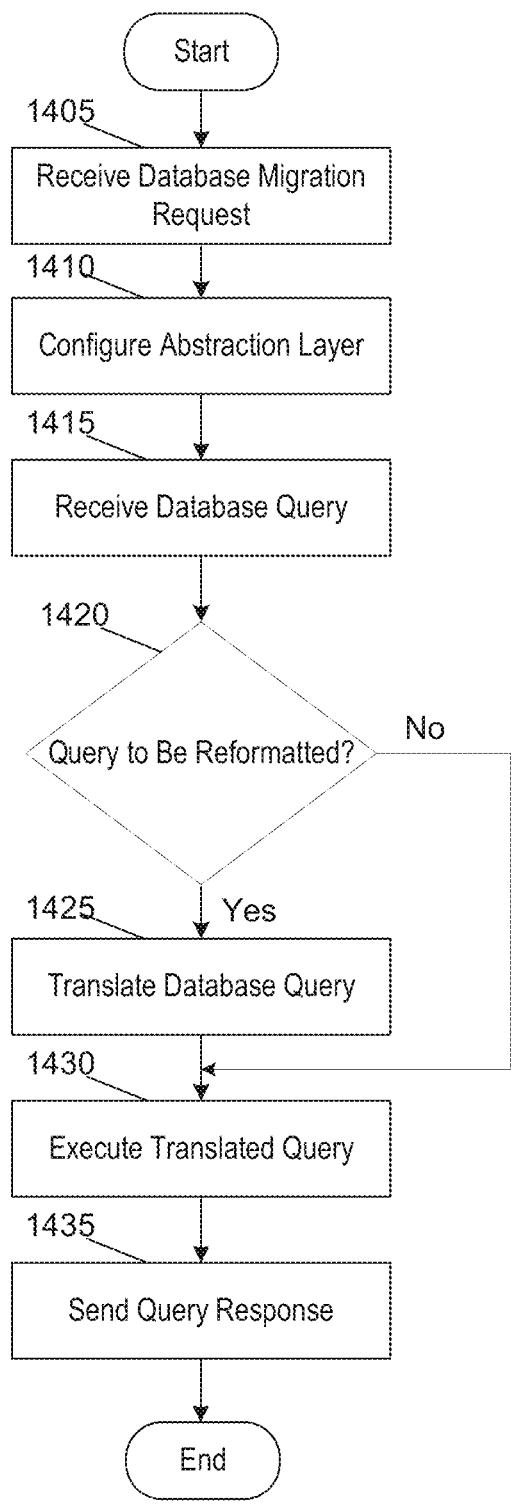

FIG. 14 depicts an illustrative method for performing transliteration of machine interpretable languages using an abstraction layer in accordance with one or more example embodiments. In particular, the example method illustrated in FIG. 14 illustrates how a database migration process may occur and how an abstraction layer may be configured to support client applications which consume data from the migrated database. At step 1405, a computing platform (such as the query translation platform 920) may receive a database migration request. For example, the query translation platform 920 may receive a request from the administrator computing device 950 to migrate source data formatted in a first format/dialect and stored in a first database (e.g., first data source system 930) to target data formatted in a second format/dialect and stored in a second database (e.g., second data source system 940).

At step 1410, the query translation platform 920 may configure an abstraction layer to intercept database queries, received from client applications, directed to one or more databases corresponding to the query translation platform 920 (e.g., first data source system 930, second data source system 940, and/or other data sources). In some instances, the query translation platform 920 may configure the abstraction layer to identify whether or not a received query is formatted for execution on a target database. Additionally or alternatively, the abstraction layer may be created (e.g., by query translation platform 920) as one or more interfaces, software libraries, and/or database drivers that may be loaded and/or otherwise used by one or more data consuming applications (which may, e.g., be configured to consume, use, interact with, modify, request and/or otherwise access data from first data source system 930 in a first format/dialect).

At step 1415, the query translation platform 920 may receive a database query. For example, as described above with regard to steps 1105, 1205, and 1305, the query translation platform 920 may receive a query formatted in a first format (e.g., a source format) corresponding to a first database (e.g., first data source system 930) or a second format (e.g., a target format) corresponding to a second database (e.g., second data source system 940).

At step 1420, the query translation platform 920 may identify whether or not the database query needs translation. For example, the query translation platform 920 may identify whether the database query is formatted in the second format corresponding to the second data source system 940. If the query translation platform 920 identifies that the database query does not need to be reformatted, it may proceed to step 1430. Otherwise, if the query translation platform 920 identifies that the database query does need to be reformatted, it may proceed to step 1425.

At step 1425, the query translation platform 920 may translate the database query using one or more of the methods described above with regard to FIGS. 11-13 (e.g., transliteration, recursive transliteration, and/or transpilation). At step 1430, the query translation platform 920 may execute the translated query on the second data source system 940 to produce a query result. At step 1435, the query translation platform 920 may return to the query result to the client application (which may, e.g., enable the client application to continue operating normally with respect to the migrated data, without requiring any reconfiguration or reprogramming of the client application itself). This abstraction layer is further described above with regard to FIGS. 4A-4B and their corresponding descriptions.

Figure 15:
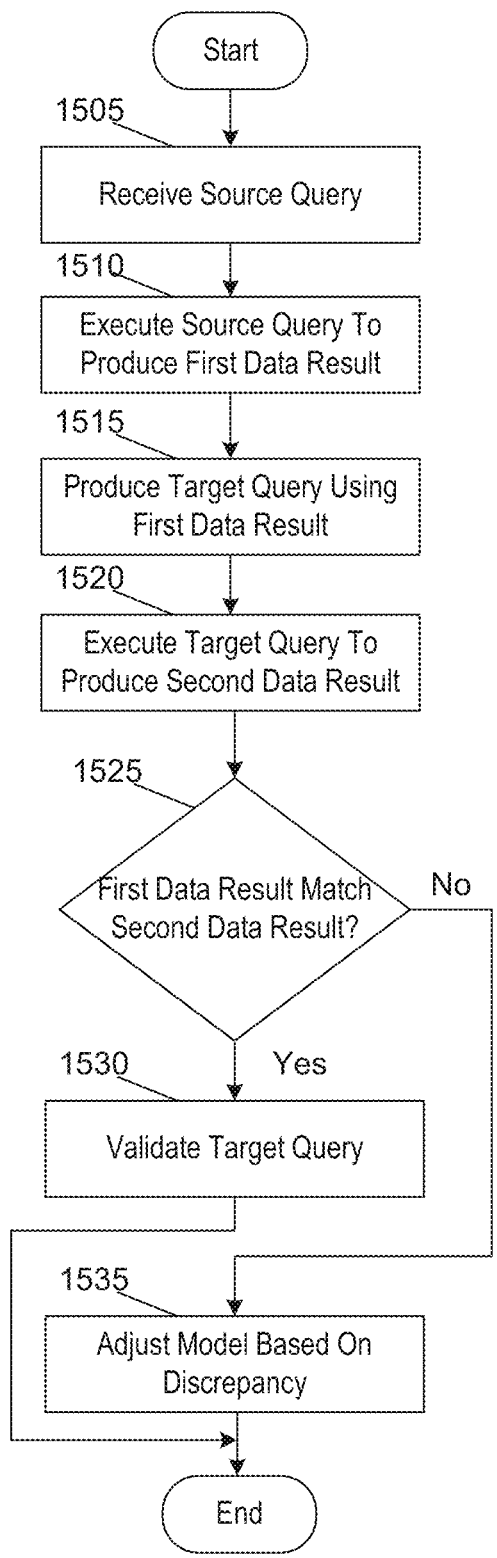

FIG. 15 depicts an illustrative method for smart dynamic reversal query generation in accordance with one or more example embodiments. In particular, the method illustrated in FIG. 15 shows how translated database queries may be validated, which may ensure optimal performance of the architecture and abstraction layer, as well as the transliteration, transpilation, and/or other translation processes described herein. At step 1505, a computing platform (e.g., the query translation platform 920) may receive a source query. In some instances, the query translation platform 920 may receive the source query in response to a request to migrate queries from a source database to a target database, a request to refine the reversal logic engine, and/or other requests. In some instances, the method described in FIG. 15 may be used for validation of translated queries, as noted above. Accordingly, in some instances, rather than receiving the source query from the user device 910 as described in FIGS. 11-14, the query translation platform 920 may receive the source query from the administrator computing device 950.

At step 1510, the query translation platform 920 may execute the source query to produce a first data result. For example, the query translation platform 920 may execute the source query on the first data source system 930 to produce a result formatted in the source dialect/format.

At step 1515, the query translation platform 920 may feed the first query result into a reversal logic engine configured to produce queries in a target format/dialect using query results of the source dialect/format. For example, the query translation platform 920 may traverse a generator class, and/or otherwise produce the queries. In doing so, the query translation platform 920 may produce a target query corresponding to the source query.

At step 1520, the query translation platform 920 may execute the target query on the second data source system 940 to produce a second query result (e.g., formatted in the target dialect/format). At step 1525, the query translation platform 920 may identify whether or not the first query result matches the second query result. If the query translation platform 920 identifies that the first query result does not match the second query result, the query translation platform 920 may proceed to step 1535. If the query translation platform 920 identifies that the first query does match the first query result, the query translation platform 920 may proceed to step 1530.

At step 1530, the query translation platform 920 may add the target query to a query translation library, and may associate the target query with one or more pre-verified query keys corresponding to the source query. In doing so, the query translation platform 920 may validate that results of the target query match those of the source query, and thus the target query is valid for use in the query translation library (which may, e.g., be used to perform the query translations described above with regard to FIGS. 11-14). In some instances, these query translations may be performed once the method depicted in FIG. 15 has been performed. At step 1535, the query translation platform 920 may adjust the reversal logic engine (and/or one or more machine learning algorithms within the reversal logic engine) to correct for the discrepancy in the query results. In some instances, in adjusting the reversal logic engine, the query translation platform 920 may store, in a query translation library and along with a pre-verified query key corresponding to the target query, one or more translation rules, which may indicate an adjustment to target queries, output using the pre-verified query key, which compensates for the discrepancy. This reverse query generation process is further described above with regard to FIG. 6 and its corresponding description.

Figure 16:
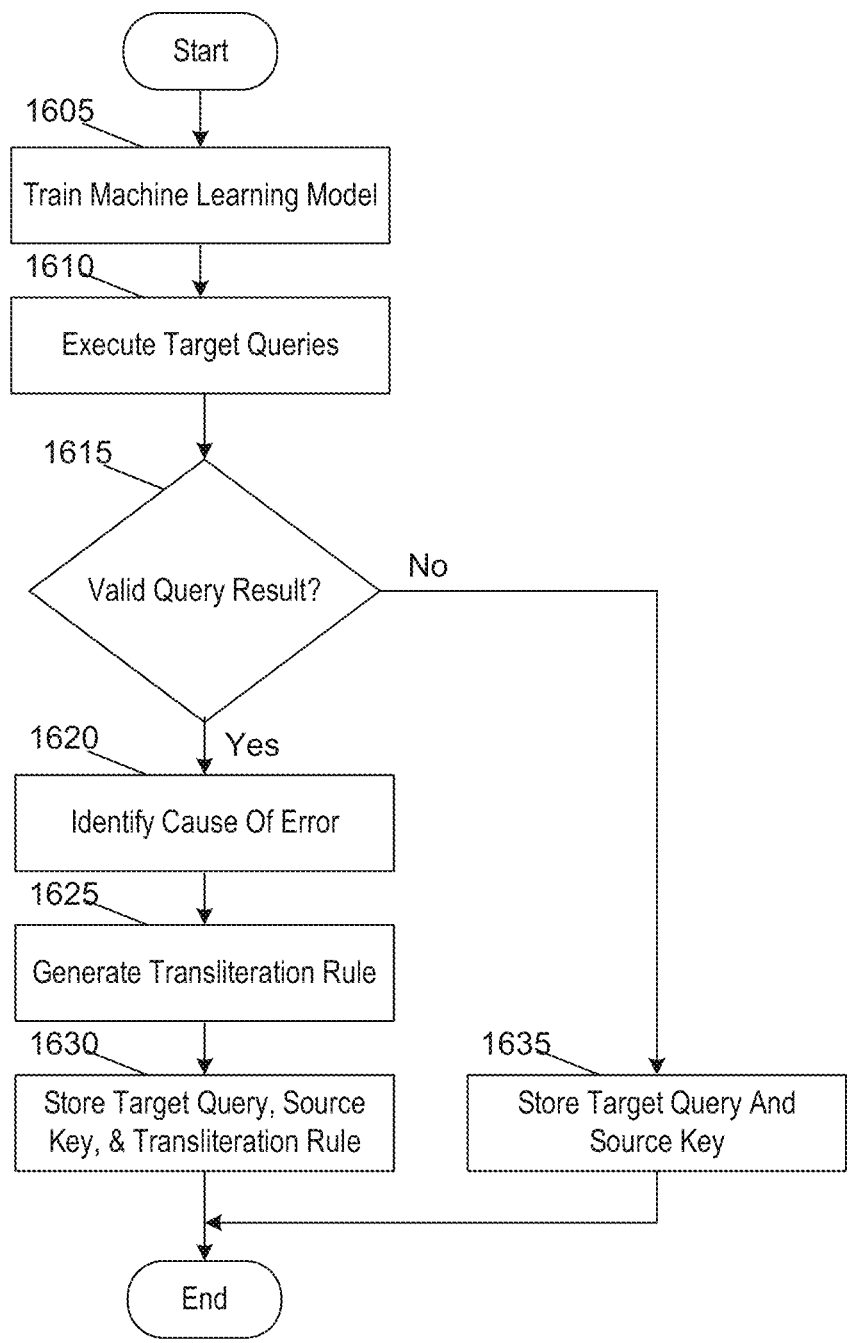

FIG. 16 depicts an illustrative method for efficient query translation using transpilation in accordance with one or more example embodiments. At step 1605, a computing platform (e.g., the query translation platform 920) may train a machine learning model to generate output queries in a target dialect/format (e.g., corresponding to the second data source system 940) from input queries in a source dialect/format (e.g., corresponding to the first data source system 930), and may produce output/target queries accordingly. For example, the query translation platform 920 may train the machine learning model using syntax trees corresponding to the source dialect and the target dialect, and relationships between those trees. In doing so, the query translation platform 920 may train the machine learning model to identify corresponding target dialect queries in real time based on an input query in the source dialect. In some instances, the query translation platform 920 may train the machine learning model during and/or in response to a data migration from a first database configured in the source dialect to a second database configured in the target dialect.

At step 1610, the query translation platform 920 may execute the target queries (produced at step 1605) on the second data source system 940 to produce query results. At step 1615, the query translation platform 920 may identify whether or not the query results are valid. For example, the query translation platform 920 may identify whether each query produces a query result, or results in error. For target queries resulting in valid results, the query translation platform 920 may proceed to step 1635. For target queries resulting in error, the query translation platform 920 may proceed to step 1620.

At step 1620, the query translation platform 920 may identify a cause of the error. For example, the query translation platform 920 may identify an error in the language, format, spelling, and/or otherwise in the target query. In some instances, the query translation platform 920 may identify the cause of error based on user input. For example, a user of the administrator computing device 950 may manually review the target query and provide an input indicating the error. Additionally or alternatively, the query translation platform 920 may automatically identify the cause of error (e.g., using one or more machine learning models or other techniques). By providing this query validation, the query translation platform 920 may prevent errors in future query processing (e.g., because machine language processing is not forgiving to identified errors).

At step 1625, the query translation platform 920 may generate a transliteration rule based on the identified error. For example, the query translation platform 920 may generate a transliteration rule that identifies the error and indicates a correction to the target query that remedies the error and causes the target query to produce a valid query result. As a particular example, the query translation platform 920 may identify the error as a missing space, and thus may generate a rule indicating that the space should be input once the source query is translated to the target dialect.

At step 1630, the query translation platform 920 may store the target queries, their corresponding transliteration rules, and their corresponding source query keys (e.g., query keys for the input/source queries similar to those described above—for example, the source query keys may correspond to the source queries once their non-essential parameters have been removed and replaced with pointers). For example, the query translation platform 920 may store the target queries, the transliteration rules, and the source query keys in a query translation library (e.g., which may be the query translation library described above and used in query translation with regard to FIGS. 12 and 13). In some instances, the query translation platform 920 may update the machine learning model based on the transliteration rules and the identified error.

At step 1635, the query translation platform 920 may store the target queries and their corresponding source query keys. For example, in these instances, because an error was not identified by the query translation platform 920, the query translation platform 920 might not store a corresponding transliteration rule. The query translation platform 920 may store the target queries and their corresponding source query keys in the query translation library. This transpilation method is described further above with regard to FIG. 5 and its corresponding description.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
receive a request to perform a data migration from a first database configured in a first format to a second database configured in a second format;
configure an abstraction layer connected to the first database and the second database, wherein the abstraction layer is configured to intercept queries from a client application to the first database and the second database;
receive, from the client application and at the abstraction layer, a query;
identify whether the query is formatted for execution at the second database;
based on identifying that the query is formatted for execution at the second database, route the query to the second database for execution to produce a query response;
based on identifying that the query is not formatted for execution at the second database:
translate the query from the first format to the second format, wherein translating the query comprises executing a transliteration process using pre-verified query keys stored in a query translation library to convert the query from the first format into the second format, wherein translating the query comprises translating, using a machine learning model, the query, and wherein performing the translation comprises:
producing, by executing the query on the first database, an initial query response,
producing, by executing the translated query on the second database, the query response,
identifying a discrepancy between the initial query response and the query response,
generating, based on the discrepancy, one or more translation rules indicating how to adjust the query response to match the initial query response, and
updating, based on the one or more translation rules, the query response;
send the query response to the client application; and
update, based on the identified discrepancy and the one or more translation rules, the machine learning model, wherein updating the machine learning model comprises:
storing, along with the pre-verified query keys used to perform the translation, the one or more translation rules, wherein further queries, translated using the pre-verified query keys, are translated further based on the one or more query translation rules to compensate for the identified discrepancy.

2. The computing platform of claim 1, wherein executing the transliteration process comprises:
parsing the query to create a query key, wherein creating the query key comprises:
extracting non-essential portions of the query from the query, and
replacing the non-essential portions of the query with pointers;
storing the non-essential portions of the query as query parameters, wherein the query parameters are stored along with their corresponding pointers;
executing a lookup function on the query translation library to identify at least one pre-verified query key that matches the query, wherein the at least one pre-verified query key includes the corresponding pointers; and
updating the at least one pre-verified query key to include the query parameters based on the corresponding pointers to create the translated query.

3. The computing platform of claim 2, wherein identifying the translated query comprises:
comparing the query key to a plurality of pre-verified query keys to identify a match between the query key and the at least one pre-verified query key; and
selecting the at least one pre-verified query key.

4. The computing platform of claim 2, wherein updating the at least one pre-verified query key to include the query parameters comprises replacing the corresponding pointers with the query parameters.

5. The computing platform of claim 2, wherein executing the lookup function on the query translation library to identify the translated query corresponding to the query key comprises:
   identifying that the query translation library includes portions of the query key rather than the query key; and
   based on identifying that the query translation library includes portions of the query key rather than the query key, recursively identifying the translated query by nesting portions of the query key.

6. The computing platform of claim 5, wherein recursively identifying the translated query comprises:
   identifying a first pre-verified query key corresponding to a first portion of the query key;
   identifying a second pre-verified query key corresponding to a second portion of the query key; and
   combining the first pre-verified query key with the second pre-verified query key to create a combination query key that matches the query key, wherein the combination query key is formatted using the second format.

7. The computing platform of claim 6, wherein the combination query key includes the second pre-verified query key nested within the first pre-verified query key.

8. The computing platform of claim 6, wherein execution of the translated query on the second database produces a query result, and wherein the query result is returned to the client application.

9. The computing platform of claim 8, wherein the memory stores additional computer-readable instructions that, when executed by the at least one processor, cause the computing platform to:
   update, after producing the query result, the query translation library to include the combination query key.

10. The computing platform of claim 2, wherein extracting the non-essential portions of the query from the query comprises extracting one or more of:
   a number of spaces, tabs, or newlines in the query,
   an upper or lower-case syntax of key words in the query,
   punctuations of the query,
   parameters used to signify table or variable names, or constants.

11. The computing platform of claim 1, wherein a second query, different than the query and comprising different characters than the query, is translated, using the pre-verified query keys stored in the query translation library to convert the second query from the first format into the second format, wherein the pre-verified query keys were used to translate the query, and wherein the translated second query is different than the translated query and has different characters than the translated query.

12. The computing platform of claim 1, wherein the translation is performed using a custom driver configured with the abstraction layer.

13. The computing platform of claim 2, wherein executing the lookup function on the query translation library to identify the at least one pre-verified query key that matches the query comprises:
   identifying that no pre-verified query keys comprise an exact match for the query, and
   based on identifying that no pre-verified query keys comprise the exact match, identifying, using fuzzy matching, the at least one pre-verified query key.

14. A method comprising:
   at a computing platform comprising at least one processor, a communication interface, and memory:
      receiving a request to perform a data migration from a first database configured in a first format to a second database configured in a second format;
      configuring an abstraction layer connected to the first database and the second database, wherein the abstraction layer is configured to intercept queries from a client application to the first database and the second database;
      receiving, from the client application and at the abstraction layer, a query;
      identifying whether the query is formatted for execution at the second database;
      based on identifying that the query is formatted for execution at the second database, routing the query to the second database for execution to produce a query response;
      based on identifying that the query is not formatted for execution at the second database:
         translating the query from the first format to the second format, wherein translating the query comprises executing a transliteration process using pre-verified query keys stored in a query translation library to convert the query from the first format into the second format, wherein translating the query comprises translating, using a machine learning model, the query, and wherein performing the translation comprises:
            producing, by executing the query on the first database, an initial query response,
            producing, by executing the translated query on the second database, the query response,
            identifying a discrepancy between the initial query response and the query response,
            generating, based on the discrepancy, one or more translation rules indicating how to adjust the query response to match the initial query response, and
            updating, based on the one or more translation rules, the query response;
      sending the query response to the client application; and
      updating, based on the identified discrepancy and the one or more translation rules, the machine learning model, wherein updating the machine learning model comprises:
         storing, along with the pre-verified query keys used to perform the translation, the one or more translation rules, wherein further queries, translated using the pre-verified query keys, are translated further based on the one or more translation rules to compensate for the identified discrepancy.

15. The method of claim 14, wherein executing the transliteration process comprises:
   parsing the query to create a query key, wherein creating the query key comprises:
      extracting non-essential portions of the query from the query, and
      replacing the non-essential portions of the query with pointers;
   storing the non-essential portions of the query as query parameters, wherein the query parameters are stored along with their corresponding pointers;
   executing a lookup function on the query translation library to identify at least one pre-verified query key that matches the query, wherein the at least one pre-verified query key includes the corresponding pointers; and updating the at least one pre-verified query key to include the query parameters based on the corresponding pointers to create the translated query.

16. The method of claim 15, wherein updating the at least one pre-verified query key to include the query parameters comprises replacing the corresponding pointers with the query parameters.

17. The method of claim 15, wherein executing the lookup function on the query translation library to identify the translated query corresponding to the query key comprises:
identifying that the query translation library includes portions of the query key rather than the query key; and
based on identifying that the query translation library includes portions of the query key rather than the query key, recursively identifying the translated query by nesting portions of the query key.

18. The method of claim 17, wherein recursively identifying the translated query comprises:
identifying a first pre-verified query key corresponding to a first portion of the query key;
identifying a second pre-verified query key corresponding to a second portion of the query key; and
combining the first pre-verified query key with the second pre-verified query key to create a combination query key that matches the query key, wherein the combination query key is formatted using the second format.

19. The method of claim 18, wherein the combination query key includes the second pre-verified query key nested within the first pre-verified query key.

20. One or more non-transitory computer-readable media storing instructions that, when executed by a computing platform comprising at least one processor, a communication interface, and memory, cause the computing platform to:
receive a request to perform a data migration from a first database configured in a first format to a second database configured in a second format;
configure an abstraction layer connected to the first database and the second database, wherein the abstraction layer is configured to intercept queries from a client application to the first database and the second database;
receive, from the client application and at the abstraction layer, a query;
identify whether the query is formatted for execution at the second database;
based on identifying that the query is formatted for execution at the second database, route the query to the second database for execution to produce a query response;
based on identifying that the query is not formatted for execution at the second database:
translate the query from the first format to the second format, wherein translating the query comprises executing a transliteration process using pre-verified query keys stored in a query translation library to convert the query from the first format into the second format, wherein translating the query comprises translating, using a machine learning model, the query, and wherein performing the translation comprises:
producing, by executing the query on the first database, an initial query response,
producing, by executing the translated query on the second database, the query response,
identifying a discrepancy between the initial query response and the query response,
generating, based on the discrepancy, one or more translation rules indicating how to adjust the query response to match the initial query response, and
updating, based on the one or more translation rules, the query response;
send the query response to the client application; and
update, based on the identified discrepancy and the one or more translation rules, the machine learning model, wherein updating the machine learning model comprises:
storing, along with the pre-verified query keys used to perform the translation, the one or more translation rules, wherein further queries, translated using the pre-verified query keys, are translated further based on the one or more translation rules to compensate for the identified discrepancy.

* * * * *